United States Patent
Samardzija et al.

(10) Patent No.: US 9,565,633 B2
(45) Date of Patent: Feb. 7, 2017

(54) OPPORTUNISTIC INFORMATION FORWARDING USING WIRELESS TERMINALS IN THE INTERNET-OF-THINGS

(71) Applicants: Dragan Samardzija, Highlands, NJ (US); Howard Huang, New York, NY (US); Vijay Venkateswaran, Dublin (IE); Chih-Kuang Lin, Dublin (IE); Irwin Kennedy, Londonerry (IE); Richard Abbot, Belle Mead, NJ (US)

(72) Inventors: Dragan Samardzija, Highlands, NJ (US); Howard Huang, New York, NY (US); Vijay Venkateswaran, Dublin (IE); Chih-Kuang Lin, Dublin (IE); Irwin Kennedy, Londonerry (IE); Richard Abbot, Belle Mead, NJ (US)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 29 days.

(21) Appl. No.: 14/323,146

(22) Filed: Jul. 3, 2014

(65) Prior Publication Data
US 2016/0007288 A1 Jan. 7, 2016

(51) Int. Cl.
*H04W 52/02* (2009.01)
*H04L 29/08* (2006.01)
(Continued)

(52) U.S. Cl.
CPC .......... *H04W 52/0229* (2013.01); *H04L 67/12* (2013.01); *H04W 4/008* (2013.01); *H04W 56/001* (2013.01); *H04W 84/18* (2013.01)

(58) Field of Classification Search
None
See application file for complete search history.

(56) References Cited

U.S. PATENT DOCUMENTS

| 5,790,946 A * | 8/1998 | Rotzoll | H04W 52/0229 |
| | | | 455/343.1 |
| 8,452,998 B2 * | 5/2013 | Paljug | G06F 1/3209 |
| | | | 713/320 |

(Continued)

FOREIGN PATENT DOCUMENTS

EP     2 833 680 A1     2/2015

OTHER PUBLICATIONS

Wu et al., "A Shared Opportunistic Infrastructure for Long-lived Wireless Sensor Networks," Third International ICST Conference, MOBILIGHT 2011, Bilbao, Spain, May 9-10, 2011.

*Primary Examiner* — Brian Roberts
(74) *Attorney, Agent, or Firm* — Tong, Rea, Bentley & Kim, LLC

(57) ABSTRACT

A capability for opportunistic forwarding of information using a wireless terminal is presented. An energy limited node includes a wake-up circuit configured to detect a wake-up signal from a wireless terminal where the wake-up signal includes a modulated waveform signal, and a communication module configured to switch, based on a control signal generated by the wake-up circuit, from a sleep mode in which the communication module is not operable to communicate with the wireless terminal to an active mode in which the communication module is operable to communicate with the wireless terminal. A wireless terminal includes a first wireless communication interface configured for communication with a device using a wireless communication protocol, a second wireless communication interface configured for wireless communication with a wireless access node of a wireless network, and a processor configured to support opportunistic forwarding of information between the device and the wireless access node of the wireless network.

24 Claims, 7 Drawing Sheets

(51) Int. Cl.
    *H04W 4/00*     (2009.01)
    *H04W 56/00*     (2009.01)
    *H04W 84/18*     (2009.01)

(56) References Cited

U.S. PATENT DOCUMENTS

| | | | |
|---|---|---|---|
| 2007/0273484 A1* | 11/2007 | Cederlof | H04W 52/0225 340/10.33 |
| 2010/0074119 A1* | 3/2010 | Krishnaswamy | H04L 47/10 370/242 |
| 2010/0150043 A1* | 6/2010 | Kim | H04W 52/0235 370/311 |
| 2010/0216523 A1* | 8/2010 | Sebastiano | H04W 52/0229 455/574 |
| 2014/0050133 A1* | 2/2014 | Jafarian | H04W 74/085 370/311 |
| 2014/0126442 A1* | 5/2014 | Jafarian | H04W 52/0212 370/311 |

\* cited by examiner

OPPORTUNISTIC INFORMATION FORWARDING USING WIRELESS TERMINALS IN THE INTERNET-OF-THINGS

TECHNICAL FIELD

The disclosure relates generally to communications and, more specifically but not exclusively, to communications in an Internet-of-Things environment.

BACKGROUND

In general, the Internet-of-Things (IoT) is a computing concept in which physical objects are connected to the Internet. The physical objects may be IoT devices configured to communicate via the Internet (e.g., sensors, actuators, controllers, or the like) or may be physical objects associated with IoT devices configured to communicate via the Internet. In either case, the IoT devices support communications and may support various other functions (e.g., discovering the existence of other IoT devices, providing information, negotiating service agreements, and the like), typically with little or no human assistance or supervision. The deployment and use of increasing numbers of IoT devices is expected to lead to a wide variety of applications which may significantly improve quality of life. For example, IoT devices may be used to provide retail applications, factory automation applications, healthcare applications, energy generation and distribution applications, agricultural applications, mining applications, and smart-city applications, to name just a few. However, realization of such applications is limited by the fact that most IoT devices are expected to be low-power, low-cost devices supporting only short-range wireless communications, thereby preventing the ubiquitous IoT device connectivity required to fully realize many such applications.

SUMMARY OF EMBODIMENTS

Various deficiencies in the prior art are addressed by embodiments for supporting communications of an energy limited node.

In at least some embodiments, a wireless terminal includes a first wireless communication interface configured for communication with a device using a wireless communication protocol, a second wireless communication interface configured for wireless communication with a wireless access node of a wireless network, and a processor configured to support opportunistic forwarding of information between the device and the wireless access node of the wireless network.

In at least some embodiments, a method for use by a wireless terminal includes broadcasting a wake-up signal via a first wireless communication interface configured for communication using a wireless communication protocol, receiving information from a device via the first wireless communication interface configured for communication using the wireless communication protocol, and propagating the information via a second wireless communication interface configured for wireless communication with a wireless access node of a wireless network.

In at least some embodiments, an energy limited node includes a wake-up circuit configured to detect a wake-up signal from a wireless terminal where the wake-up signal includes a modulated waveform signal, and a communication module configured to switch, based on a control signal generated by the wake-up circuit, from a sleep mode in which the communication module is not operable to communicate with the wireless terminal to an active mode in which the communication module is operable to communicate with the wireless terminal.

In at least some embodiments, a method for use by an energy limited node includes detecting, at a wake-up circuit of the energy limited node, a wake-up signal from a wireless terminal where the wake-up signal includes a modulated waveform signal, and generating, by the wake-up circuit of the energy limited node based on detector of the wake-up signal, a control signal configured to cause a communication module of the energy limited node to switch from a sleep mode in which the communication module is not operable to communicate with the wireless terminal to an active mode in which the communication module is operable to communicate with the wireless terminal.

In at least some embodiments, a wake-up circuit includes a first element configured to receive a wake-up signal from a wireless terminal and to provide a filtered or selective version of the wake-up signal, a second element configured to receive the filtered or selective version of the wake-up signal and to integrate at least a portion of the filtered or selective version of the wake-up signal that is below a cutoff frequency of the second element, and a detector configured to determine whether energy received from the second element satisfies a threshold.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements common to the figures.

DETAILED DESCRIPTION OF EMBODIMENTS

Figure 1:
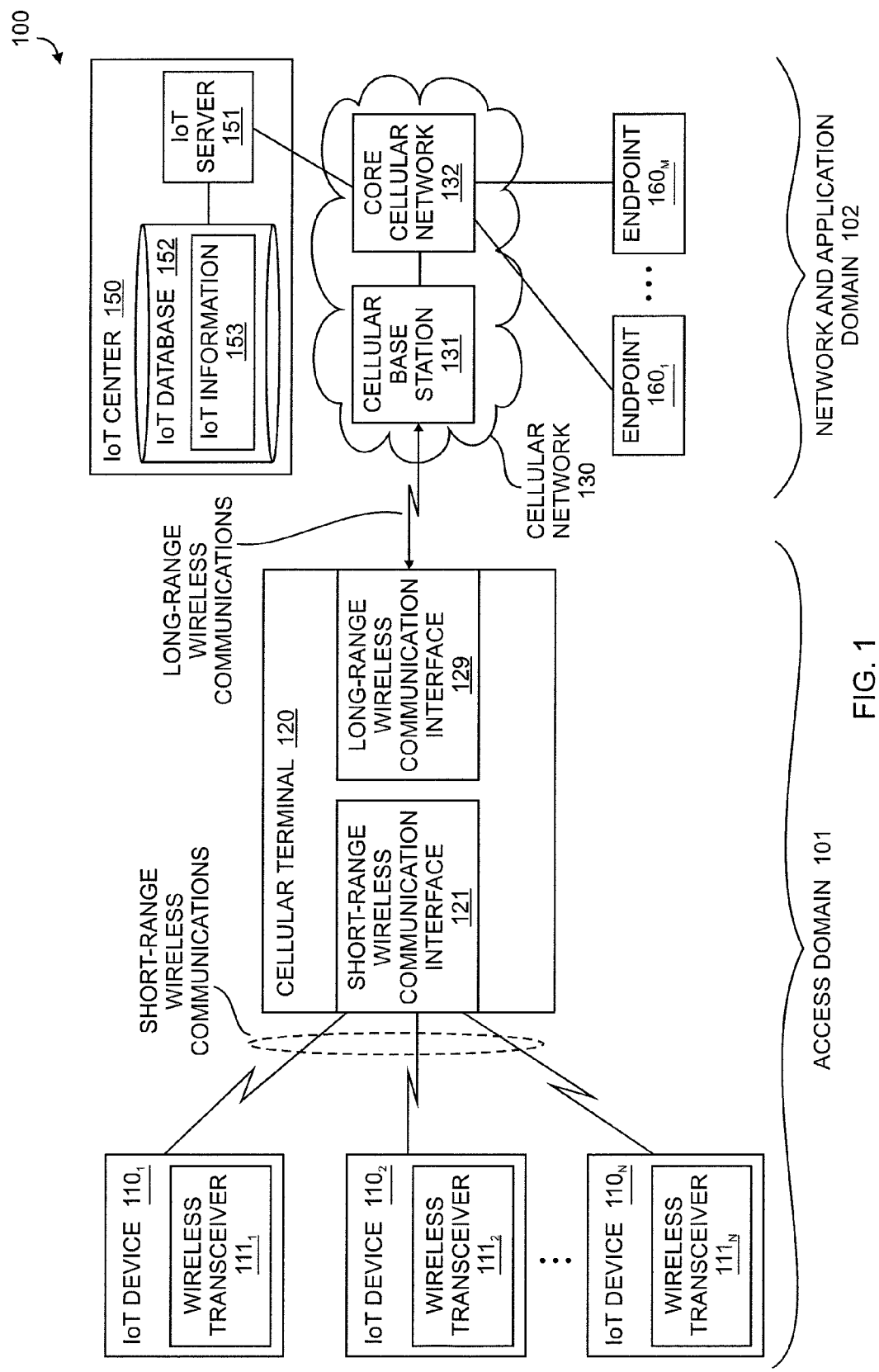
FIG. 1 depicts an exemplary communication system supporting an Internet-of-Things (IoT) environment.

In general, a capability for opportunistic forwarding of information using terminals in an Internet-of-Things (IoT) environment is presented. In general, IoT environments are expected to include IoT devices configured to communicate wirelessly. In many cases, the IoT devices are expected to be low power (e.g., for extended battery life and energy autonomy), low cost (e.g., for cost-effective large-scale deployment) devices and, thus, are expected to support only short-range wireless communications (e.g., WiFi, Zigbee, Bluetooth, or the like) as opposed to longer-range wide-area wireless communications (e.g., cellular communications), thereby tending to limit the coverage range of the IoT devices and tending to prevent ubiquitous interconnectivity of the IoT devices. By contrast, various types of wireless terminals are configured to support connectivity to wireless access networks (and, thus, the Internet and other communication networks accessible via wireless access networks). For example, cellular terminals typically support (1) short-range wireless communications via which cellular terminals may communicate locally and (2) wide-area wireless communications via which the cellular terminals may access cellular networks. Similarly, for example, other types of wireless terminals (e.g., computers supporting 802.11 wireless communications or other similar wireless terminals) also typically support short-range wireless communications via which the wireless terminals may communicate locally (including communication with wireless access points providing access to wireless access networks). Additionally, as such wireless terminals are carried by an ever-increasing percentage of the population (and, thus, such wireless terminals may be considered to at least include wireless user terminals), it is expected that various wireless terminals will enter the vicinities of IoT devices deployed in various types of environments. Thus, in order to efficiently integrate low power, low cost IoT devices to provide ubiquitous interconnectivity, various types of wireless terminals (e.g., cellular terminals, wireless terminals supporting 802.11 wireless communications, or the like) may be configured to function as communication gateways between IoT devices and wireless access networks (and, thus, the Internet and other communication networks accessible via wireless access networks). Furthermore, given that many such wireless terminals are expected to be mobile, including entering and leaving various environments in which IoT devices are deployed, communication between the IoT devices and the access wireless network may be made opportunistic (e.g., wireless terminals may support communications by IoT devices as the wireless terminals randomly enter the vicinity of the IoT devices, IoT devices may be configured to include wake-up circuitry such that power of the IoT devices may be conserved until the IoT devices are awakened by wireless terminals as necessary or desirable, and so forth). In at least some embodiments, an IoT device includes a wake-up circuit configured to detect a wake-up signal from a wireless terminal and a communication module (e.g., wireless transceiver, wireless transmitter, wireless receiver, or the like) configured to switch, based on a control signal generated by the wake-up circuit, from a sleep mode in which the communication module is not operable to communicate with the wireless terminal to an active mode in which the communication module is operable to communicate with the wireless terminal. In at least some embodiments, a wireless terminal includes a first wireless communication interface configured for communication with a device using a wireless communication protocol (e.g., WiFi, Zigbee, Bluetooth, or the like), a second wireless communication interface configured for wireless communication with a wireless access node of a wireless network (e.g., WiFi, cellular, or the like), and a processor configured to support opportunistic forwarding of information between the device and the wireless access node of the wireless network. While various embodiments are particularly well-suited for latency tolerant applications (e.g., environment sensing, object and merchandise tracking, or the like), various embodiments may be used for various other applications as discussed further below. These and various other embodiments may be better understood when considered within the context of an exemplary communication system supporting an IoT environment, as depicted in FIG. 1.

FIG. 1 depicts an exemplary communication system supporting an IoT environment.

The exemplary communication system 100 includes an access domain portion 101 and a network and application domain portion 102. The access domain portion 101 includes a set of IoT devices $110_1$-$110_N$ (collectively, IoT devices 110) and a cellular terminal (CT) 120. The network and application domain portion 102 includes a cellular network (CN) 130 including a cellular base station (CBS) 131 and a cellular core network (CCN) 132, a communication network (CN) 140, an IoT center 150, and a set of endpoints $160_1$-$160_M$ (collectively, endpoints 160). The CT 120 is configured to operate as a gateway supporting communications between IoT devices 110 and CN 130 (and, thus, between IoT devices 110 and various other devices accessible via CN 130, such as IoT center 150, endpoints 160, or the like), as discussed in additional detail below.

The IoT devices 110 include low-power, low-cost devices, and also may be referred to herein as energy limited nodes 110. As discussed above, since the IoT devices 110 are low-power, low-cost devices, IoT devices 110 support only short-range wireless communications (e.g., Institute of Electrical and Electronics Engineers (IEEE) 802.11 (which also may be referred to as WiFi), Bluetooth, Zigbee, or the like). Thus, as illustrated, an IoT device 110 at least includes a wireless transceiver 111 configured to support short-range wireless communications by the IoT device 110. This is illustrated as wireless transceivers $111_1$-$111_N$ (collectively, wireless transceivers 111) of the IoT devices $110_1$-$110_N$, respectively. The IoT devices 110 may be object tags attached to or otherwise associated with physical objects, sensors (e.g., temperature sensors, proximity sensors, or the like), detectors (e.g., motion detectors, carbon monoxide detectors, or the like), actuators, controllers (e.g., gas valve controllers, a mass flow controller, or the like), or the like. Again, generally speaking, an IoT device 110, depending on various factors, may or may not include components in addition to the wireless transceiver 111 (e.g., a tag attached to a physical object may or may not include additional components, whereas a temperature sensor device is expected to include a sensor subsystem, a motion detector device is expected to also include a motion detection subsystem, and so forth). The IoT devices 110 may be deployed within various types of environments (e.g., sensors and detectors within a home, actuators and security cameras within a business location, sensors and security cameras deployed on streets of a city, or the like). It will be appreciated that, although primarily depicted and described herein with respect to IoT devices 110 that are low-power, low-cost devices only supporting short-range wireless communications, various other IoT devices having various other capabilities (e.g., IoT devices having fixed power sources and integrating cellular communications capabilities for wide-area wireless communications) also may be deployed, in which case cellular terminals may operate as communications gateways for IoT devices 110 with or without also operating as communications gateways for the other IoT devices having various other capabilities (e.g., operating as communications gateways for the other IoT devices under various conditions, such as where the fixed power source for an IoT device is unavailable or the like).

The CT 120, as discussed above, is configured to operate as a gateway supporting communications between IoT devices 110 and CN 130 (and, thus, between IoT devices 110 and various other devices accessible via CN 130, such as IoT center 150, endpoints 160, or the like). The CT 120 includes a short-range wireless communication interface 121 configured for short-range wireless communication by CT 120 with IoT devices 110 and a long-range wireless communication interface 129 configured for wide-area wireless communication by CT 120 with CN 130. The functions supported by CT 120 in operating as a gateway supporting communications between IoT devices 110 and CN 130 are discussed in additional detail below. The CT 120 may be a cellular user terminal. For example, CT 120 may be a tablet computer, a smartphone, or any other cellular terminal including both short-range and wide-area wireless communication interfaces. In at least some embodiments, configuration of existing devices (e.g., tablet computers, smartphones, or the like) which may be used as CT 120 may only require changes to the operating system kernel of the terminal, while the hardware of the terminal may be fully reused. It will be appreciated that, although primarily depicted and described with respect to a single CT 120, the ubiquitous availability and use of cellular terminals such as CT 120 is expected to provide ubiquitous connectivity for ever-increasing numbers of IoT devices such as IoT devices 110.

The CN 130 may include any suitable type of cellular network which may operate as a communications interface between CT 120 and CN 140. For example, CN 130 may be a Third Generation Partnership Project (3GPP) Universal Mobile Telecommunications System (UMTS) network, a Third Generation Partnership Project Two (3GPP2) Code Division Multiple Access 2000 (CDMA-2000) network, a Long Term Evolution (LTE) network, or the like. Similarly, it will be appreciated that, depending on the implementation of CN 130, CBS 131 may be a NodeB, an eNodeB, or any other suitable type of cellular access node. Similarly, it will be appreciated that, depending on the implementation of CN 130, CCN 132 may be CDMA-2000 core cellular network, an LTE Evolved Packet Core (EPC) network, or the like). It will be appreciated that, although primarily depicted and described with respect to use of cellular communications, various other types of wireless terminals configured for various other types of wide area wireless communications may be used to provide various functions depicted and described herein (and, thus, references herein to cellular terminal and cellular network may be read more generally as wireless terminal and wireless network).

The CN 140 is configured to facilitate communication between CN 130 and various devices which may be communicatively connected to CN 140, as well as between devices which may be communicatively connected to CN 140. As depicted in FIG. 1, devices that may be communicatively connected to CN 140 may include IoT center 150, endpoints 160, or the like, as well as various combinations thereof. The CN 140 may include any suitable type of communication network(s) configured to support communications of CN 130. For example, CN 140 may include one or more public data networks (e.g., the Internet), one or more private data networks, or the like, as well as various combinations thereof. For example, CN 140 may include one or more wireline networks, one or more wireless networks, or the like, as well as various combinations thereof.

The IoT center 150 is configured to provide various functions for IoT devices 110 (e.g., discovery of IoT devices 110, management of IoT devices 110, collection of information from IoT devices 110, use of IoT devices 110 or information from IoT devices 110 by endpoints 160, or the like, as well as various combinations thereof). The IoT center 150 includes an IoT server 151 and an IoT database 152. The IoT database 152 stores IoT information 153 information associated with management and use of IoT devices 110.

The IoT server 151 is configured to provide various functions for IoT devices 110. The IoT server 151 may support discovery of IoT devices 110, management of IoT devices 110, processing and storage of information provided by IoT devices 110, processing and storage of control information intended for delivery to IoT devices 110, delivery of control information to IoT devices 110, or the like, as well as various combinations thereof. The IoT server 151 may be configured to manage individual IoT devices 110, groups of IoT devices 110 (e.g., organized based on the location or environment in which the IoT devices are deployed, device types of the IoT devices 110, or the like), or the like, as well as various combinations thereof.

The IoT server 151 is configured to communicate with IoT devices 110 via CN 130 and CN 140. The communication between IoT server 151 and an IoT device 110 may be unidirectional or bidirectional. The IoT server 151 may communicate with IoT devices 110 for purposes of discovering IoT devices 110, managing IoT devices 110, receiving information from IoT devices 110 and processing the information from the IoT devices 110 for storage as part of the IoT information 153 maintained in IoT database 152, receiving information intended for delivery to IoT devices 110 and processing the information intended for delivery to the IoT devices 110 for storage as part of the IoT information 153 maintained in IoT database 152, delivering control information to IoT devices 110, or the like, as well as various combinations thereof.

The IoT server 151 is configured to communicate with endpoints 160 via CN 140. The IoT server 151 may communicate with endpoints 160 for enabling endpoints 160 to utilize IoT devices 110 (e.g., to provide endpoints 160 within information received from IoT devices 110, to enable endpoints 160 to access and use information provided by IoT devices 110, to enable endpoints 160 to access IoT devices 110 (e.g., supporting authentication by endpoints 160 with IoT devices), to enable endpoints 160 to control the operation of IoT devices 110, or the like, as well as various combinations thereof).

The IoT server 151 may be configured to provide various functions associated with use of multiple CTs configured as depicted and described for CT 120. The IoT server 151 may be configured to support in-order delivery of data (e.g., in-order storage of information received from IoT devices 110, in-order delivery of information to IoT devices 110, in-order delivery of information to endpoints 160, or the like, as well as various combinations thereof). The IoT server 151 may be configured to detect duplicate data (e.g., such as where multiple CTs within the vicinity of an IoT device 110 receive and propagate the same information associated with the IoT device 110), and to prevent storage of duplicate data within IoT database 152. The IoT server 152 may be configured to support interaction between CTs (e.g., establishment of associations between CTs, controlling which CTs are to wake up particular IoT devices 120, controlling priority amongst CTs in a group of CTs, or the like, as well as various combinations thereof), as discussed in additional detail below.

The IoT server 151 may be deployed and managed by various entities (e.g., a service provider, a third party, or the like). The IoT server 151 may provide an open-source application programming interface (API) for any qualified application which may utilize or benefit from IoT devices 110 (e.g., utilize information from IoT devices 110 which may be retrieved from IoT devices 110 or from IoT information 153 maintained by IoT center 150, interface with IoT devices 110 for configuring or controlling IoT devices 110, or the like, as well as various combinations thereof). For example, such applications may query IoT server 152 to determine when and where a particular IoT device 110 was most recently detected, to obtain current status information associated with the IoT device 110, to authenticate for obtaining access to the IoT device 110, or the like, as well as various combinations thereof. The use of such applications is discussed further below with respect to endpoints 160, as at least some of the endpoints 160 may be applications, or devices hosting applications, which might utilize such APIs.

The IoT database 152 stores the IoT information 153 associated with IoT devices 110. The IoT information 153 may include IoT device registration information associated with IoT devices 110 (e.g., a device identifier, an address, a device type, device capability information, energy source information, communication characteristics information, or the like), information provided by IoT devices 110 (e.g., status information, information indicative of the most recent time the IoT device 110 was detected, energy source information, communication characteristics information, sensor readings, detector indicators, actuator status information, or the like), control information intended for delivery to IoT devices 110 (e.g., configuration information for configuring IoT devices 110, control information for controlling the operation of IoT device 110, or the like), or the like, as well as various combinations thereof. It will be appreciated that various portions of IoT information 153 may be received by IoT database 152 from the server 151, from IoT devices 110 or endpoints 160 via server 151, from one or more other devices via server 151, from one or more administrators, or the like, as well as various combinations thereof. It will be appreciated that, since IoT devices 110 may be deployed in various environments or areas and may collect various types of information related to conditions in the associated environments or areas, IoT information 153 also may be considered to include environment-specific or area-specific information (e.g., a pollen count in a particular geographic area, temperature readings from a particular indoor location, or the like).

The endpoints 160 may include any endpoints which may utilize or benefit from IoT devices 110 (e.g., utilize information from IoT devices 110 which may be retrieved from IoT devices 110 or from IoT information 153 maintained by IoT center 150, interface with IoT devices 110 for configuring or controlling IoT devices 110, or the like, as well as various combinations thereof). For example, endpoints 160 may include end user devices (e.g., computers, smart phones, or the like), application servers, applications, or the like, as well as various combinations thereof. For example, where the IoT devices 110 are energy meters in a particular area served by an energy provider, an application of the energy provider may be configured to periodically access IoT server 151 in order to retrieve the latest energy meter readings reported by the energy meters to the IoT server 151 for storage in the IoT database 152 (e.g., here the endpoint 160 may be considered to be the application or a device hosting the application). For example, where an IoT device 110 is configured to lock and unlock doors and windows of a home, a user may use his or her endpoint 160 (e.g., a computer at work, a personal smart phone, or the like) to remotely access the IoT device 110 in order to remotely lock or unlock the doors or windows. In at least some embodiments, one endpoint 160 may communicate with one or more other endpoints 160 regarding IoT information (e.g., such as where an application retrieves pollen count information from IoT server 151 and then provides the pollen count information to end users of the application, an application retrieves from IoT server 151 environment information related to conditions in a home and provides the environment information to the homeowner via the application, or the like). It will be appreciated that the foregoing examples are merely a few of the many ways in which endpoints 160 may utilize IoT devices 110.

The CT 120, as discussed above, is configured to operate as a gateway supporting communications between IoT devices 110 and CN 130. The CT 120, after entering the wireless coverage range of an IoT device 110, may participate in short-range wireless communications with the wireless transceiver 111 of the IoT device 110 via short-range wireless communication interface 121. The short-range wireless communications between CT 120 and IoT device 110 may be unidirectional or bidirectional. In the case of unidirectional short-range wireless communication, CT 120 may support upstream communication from IoT device 110 to CN 130. For upstream communication, for example, CT 120 may receive information from IoT device 110 via short-range wireless communication interface 121 and propagate the information toward CN 130 via the long-range wireless communication interface 129 between CT 120 and CN 130 (e.g., for delivery to one or more of IoT server 151, one or more of the endpoints 160, or the like). In the case of bidirectional short-range wireless communications, CT 120, in addition to supporting upstream communications from IoT device 110 to CN 130 as discussed above for the unidirectional case, also may support downstream communication from CN 130 to IoT device 110. For downstream communication, for example, CT 120 may receive information from CN 130 (e.g., from one or more of IoT server 151, one or more of the endpoints 160, or the like) via the long-range wireless communication interface 129 between CT 120 and propagate the information toward IoT device 110 via short-range wireless communication interface 121 between CT 120 and IoT device 110.

The information communicated upstream from the IoT device 110 to CT 120 via the short-range wireless communication interface 121 may include association information for enabling IoT device 110 to associate with CN 130 (e.g., a request by IoT device 110 to establish an associated with CN 130), authentication information for authenticating IoT device 110 to CN 130 (e.g., a request by IoT device 110 to be authenticated by CN 130, which may include associated authentication credentials), information stored on IoT device 110 (e.g., an identifier of IoT device 110, an address of the IoT device 110, status information associated with IoT device 110, or the like), information determined by IoT device 110 (e.g., one or more sensor readings where IoT device 110 is a sensor, one or more detector indicators where IoT device 110 is a detector, or the like), or the like, as well as various combinations thereof. As discussed above, such information may be intended for delivery to one or more of IoT server 151 (e.g., for storage as part of IoT information 153 in IoT database 152), one or more endpoints 160, or the like).

In the case of upstream communications from IoT device 110 to CN 130, the CT 120 may propagate the received information toward CN 130 via the long-range wireless communication interface 129 without modifying the received information (e.g., CT 120 simply functions as a pass-through gateway between IoT device 110 and CN 130), or may modify the received information to provide modified information and then propagate the modified information toward CN 130 via the long-range wireless communication interface 129. The modification of received information may include supplementing the received information to include additional information. The additional information may include one or more of timestamp information, location information, or the like, as well as various combinations thereof. The timestamp information may include a timestamp associated with the information being propagated from the IoT device 110 to CN 130 via CT 120 (e.g., a timestamp indicative of a time at which the CT 120 received the information from the IoT device 110). The location information may include a location of the IoT device 110, a location of the CT 120 when the CT 120 received the information from IoT device 110, or the like, as well as various combinations thereof. The location information may include geographic location information, indoor location information, or the like, as well as various combinations thereof. The CT 120 may determine the location information based on one or more of an assisted-GPS capability of CT 120, a GPS capability of CT 120, an indoor location determination capability, or the like, as well as various combinations thereof. The additional information may be added in any suitable manner (e.g., as one or more stamps for each block of data exchanged, via appending of the information, via inclusion within a protocol data unit (PDU) as part of a higher-layer protocol (e.g., at or above the transport layer as defined in the Open Systems Interconnection (OSI) protocol stack or the Transmission Control Protocol (TCP)/Internet Protocol (IP) stack), or the like, as well as various combinations thereof). It will be appreciated that, although primarily depicted and described with respect to embodiments in which the CT 120 determines the additional information for upstream communications from IoT device 110 to CN 130, in at least some embodiments at least a portion of such additional information may be provided by the IoT device 110 as part of the upstream communications sent by the IoT device 110 to the CT 120. The modification of received information also may include any other suitable processing which CT 120 may perform on the received information before propagating the received information toward CN 130 (e.g., formatting, aggregation, interpretation, or the like, as well as various combinations thereof).

The information communicated downstream from the CT 120 to the IoT device 110 via the short-range wireless communication interface 121 may include association information for enabling IoT device 110 to associate with CN 130 (e.g., a response to a request by IoT device 110 to establish an associated with CN 130), authentication information for authenticating IoT device 110 to CN 130 (e.g., a response to a request by IoT device 110 to be authenticated by CN 130, which may include an indication as to whether or not authentication of the IoT device 110 was successful), a request for IoT device 110 to provide information stored on or determined by the IoT device 110 (e.g., status information associated with IoT device 110, one or more sensor readings where IoT device 110 is a sensor, one or more detector indicators where IoT device 110 is a detector, or the like), a command for IoT device 110 to perform an action (e.g., take a reading, perform an actuation, or the like), configuration information adapted for configuring the IoT device 110 (e.g., a parameter for controlling collection of information by IoT device 110, a parameter for modifying a threshold used by the IoT device 110 is performing detection, a software update, or the like), or the like, as well as various combinations thereof. As discussed above, such information may be received at CT 120 from one or more of IoT server 151, one or more endpoints 160, or the like.

In the case of downstream communications from CN 130 to IoT device 110, the CT 120 may propagate the received information toward the IoT device 110 via the short-range wireless communication interface 121 without modifying the received information (e.g., CT 120 simply functions as a pass-through gateway between CN 130 and IoT device 110), or may modify the received information to provide modified information and then propagate the modified information toward the IoT device 110 via the short-range wireless communication interface 121. The modification of received information may include any suitable processing which CT 120 may perform on the received information before propagating the received information toward the IoT device 110 (e.g., formatting, aggregation, or the like, as well as various combinations thereof).

The communication of information between the IoT devices 110 and the CN 130 (and, ultimately, one or more devices accessible via CN 130) may be performed using one or more existing or specifically-designed higher-layer protocols. Here, the higher-layer protocol(s) may include protocol(s) at or above the transport layer (e.g., the transport layer as defined in the OSI protocol stack, the TCP/IP protocol stack, or any other suitable protocol stack). For example, the higher-layer protocol(s) may include protocol(s) which may ride on top of IP (e.g., at one or more of the transport layer, the session layer, the application layer, or the like, as well as various combinations thereof). The information may be transported using PDUs of the higher-layer protocol(s) (e.g., TCP segments or User Datagram Protocol (UDP) datagrams at the transport layer, session messages at the session layer, application messages at the application layer, or the like, as well as various combinations thereof). The higher-layer protocol(s) may be (1) end-to-end (e.g., between the IoT device 110 and the end device for which the information is intended or from which the information is provided, such as IoT server 151, one or more endpoints 160, or the like) or (2) two-stage (e.g., a first protocol is used between the IoT device 110 and the CT 120 and a second protocol is used between the CT 120 and the end device for which the information is intended or from which the information is provided, such as IoT server 151, one or more endpoints 160, or the like. In the two-stage case, the first higher-layer protocol between the IoT device 110 and the CT 120 may not be IP-based and the second higher-layer protocol between the CT and the end device may be IP-based, both the first and second higher-layer protocols may be IP-based (although perhaps using different higher-layer protocols at the same or different layers of the communication stack), or the like). Various combinations of such higher-layer protocol implementations are contemplated (e.g., where different IoT devices or CTs may use different layers, protocols, PDUs, or the like).

The CT 120 may be configured to support store and forward capabilities for upstream communications from IoT device 110 to CN 130 and for downstream communications from CN 130 to IoT device 110. The store and forward capabilities enable the CT 120 to store information to be communicated, rather than propagating the information as the information is received. The CT 120 may be configured to store the information until a better opportunity to forward the information arises. The CT 120 may store such information in any suitable manner (e.g., by caching the information or storing the information in any other suitable manner).

In at least some embodiments, for upstream communications from IoT device 110 to CN 130, CT 120 may store the information received IoT device 110 until detecting a condition indicative that the stored information should be forwarded toward CN 130 via long-range wireless communication interface 129. For example, the condition may include a determination that CT 120 enters a geographic area known to have relatively good wide-area coverage for access to CN 130, a determination that CT 120 currently has relatively good wide-area coverage for access to CN 130, a determination that a threshold amount of information has been received from the IoT device 110 or a set of IoT devices 110 (e.g., which may enable the energy overhead of establishing a connection with CN 130 to be amortized), temporal considerations, receipt of an indication from CN 130 that currently stored information from the IoT device 110 (or a set of IoT devices 110) may be propagated via CN 130, or the like, as well as various combinations thereof.

In at least some embodiments, for downstream communications from CN 130 to IoT device 110, CT 120 may store the information intended for IoT device 110 until detecting a condition indicative that the stored information should be forwarded toward the IoT device via the short-range wireless communication interface 121. For example, the condition may include a determination that the CT 120 is or may enter an area of poor (or no) wide-area coverage such that the CT 120 may still opportunistically deliver the information to the IoT device 110 despite having a poor (or no) connection to the CN 130, temporal considerations, a battery status of the CT 120, or the like, as well as various combinations thereof).

The CT 120 may be configured to support connection-based or connectionless communications between IoT device 110 and CN 130. The CT 120 may receive information from IoT device 110 in a connectionless manner and propagate the received information toward CN 130 with or without using a connection between CT 120 and CN 130 (or an element accessible via CN 130). The use of connectionless communication between the IoT device 110 and CT 120 may minimize or even obviate the need for the IoT device 110 to be authenticated. In at least some embodiments, in which communication between the IoT device 110 and CT 120 is connectionless, CT 120 may be configured to perform policing of information received from the IoT device 110, before forwarding the information toward CN 130, in order to ensure that the information is valid (e.g., to prevent malicious IoT devices from draining the battery of the CT 120 or attacking the CN 130 or other devices accessible via CN 130). The CT 120 may propagate information toward IoT device 110 in a connectionless manner (where the propagated information may be received from the CN 130 with or without using a connection a connection between CT 120 and CN 130 (or an element accessible via CN 130)). The communication of information between IoT device 110 and CN 130 may be performed using a single connection between the IoT device 110 and the CN 130 (or an element accessible via CN 130). The communication of information between IoT device 110 and CN 130 may be performed using a connection between the IoT device 110 and CT 120 and a connection between CT 120 the CN 130 (or an element accessible via CN 130), such that CT 120 may be configured to map information between the connections in order to support communication of information between IoT device 110 and CN 130. The CT 120 may be configured to support various combinations of such connection-based or connectionless communications between IoT device 110 and CN 130.

The CT 120 may be configured to operate as a gateway supporting communications between IoT devices 110 and CN 130 in a manner that is transparent to a user of CT 120. The use of CT 120 as a gateway supporting communications between IoT devices 110 and CN 130 is expected to consume at least some resources of CT 120 (e.g., battery resources, data communication bandwidth resources, processing resources, or the like). Accordingly, in at least some embodiments, the user of CT 120 may be provided with one or more incentives to make his or her CT 120 available for use as a gateway supporting communications between IoT devices 110 and CN 130 (e.g., providing free data communications for the user whenever his or her CT 120 is set to operate as a gateway supporting communications between IoT devices 110 and CN 130, providing pro-rated discounts on the bill of the user based on the length of time that his or her CT 120 is set to operate as a gateway supporting communications between IoT devices 110 and CN 130, or the like, as well as various combinations thereof). The CT 120 may be configured to temporarily or permanently suspend operation as a gateway supporting communications between IoT devices 110 and CN 130 responsive to one or more conditions (e.g., detection by the CT 120 that CN 130 is congested, detection by the CT 120 of an explicit request by CN 130 or IoT server 151 for operation of CT 120 as a gateway between IoT devices 110 and CN 130 to be suspended, or the like).

The CT 120 may receive information from an IoT device 110 by either being within wireless range of the IoT device 110 when the IoT device 110 transmits information or by initiating a signal adapted for causing the IoT device 110 to transmit information (which also may be a signal adapted for causing the IoT device 110 to wake up and then transmit information).

In at least some embodiments, an IoT device 110 may be configured to transmit information, and the CT 120 will receive the information from the IoT device 110 and forward the information toward CN 130 if CT 120 is within wireless range of the IoT device 110 when the IoT device 110 transmits the information. The IoT device 110 may be configured to transmit information periodically, pseudo-periodically, in response to a trigger condition (e.g., responsive to detection that a threshold of a sensor has been satisfied, responsive to detection that an actuator has been actuated, or the like), or the like, as well as various combinations thereof. The IoT device 110 may be configured to transmit information only after determining that a clear channel condition exists, where the manner in which the clear channel condition is detected may depend on the type of short-range wireless communication being used (e.g., using carrier sense multiple access with collision avoidance (CSMA/CA) where WiFi, Zigbee, or other relevant short-range wireless communication are used, using other clear channel detection mechanisms for other types of short-range wireless communications which may be used for communication between IoT device 110 and CT 120, or the like). The IoT device 110 transmits the information to CT 120 using short-range wireless communication. In such embodiments, the IoT device 110 is configured to transmit information irrespective of whether CT 120 (or any other similarly configured terminal) is within wireless range of the IoT device 110, thereby enabling passive harvesting of information of the IoT device 110 (e.g., device identifier, device address, sensor readings, detector readings, or the like) by CT 120 as CT 120 moves into the vicinity of the IoT device 110.

In at least some embodiments, an IoT device 110 may be configured to remain in an active reception mode and, responsive to receiving an indication of the presence of CT 120 within wireless range of the IoT device 110, to communicate with CT 120 via the short-range wireless communication interface 121. In the active reception mode, the wireless transceiver 111 of the IoT device 110 remains active and, thus, IoT device 110 remains operable to communicate with CT 120 via the short-range wireless communication interface 121. The indication of the presence of CT 120 within wireless range of the IoT device 110 may be communicated from CT 120 to the IoT device 110 in any suitable manner. The indication of the presence of CT 120 within wireless range of the IoT device 110 may be communicated from CT 120 to the IoT device 110 using a presence notification signal transmitted via the short-range wireless communication interface 121 of CT 120. The CT 120 may be configured to transmit the presence notification signal periodically, pseudo-periodically, in response to a trigger condition (e.g., responsive to detection that CT 120 has entered or exited a particular geographic area or indoor area, responsive to a determination that CT 120 has battery power above a threshold, or the like), or the like, as well as various combinations thereof. The communication between the IoT device 110 and the CT 120 uses short-range wireless communication. In such embodiments, the IoT device 110 is configured to transmit information responsive to reception of the presence notification signal from CT 120 (or any other similarly configured terminal) is within wireless range of the IoT device 110, thereby enabling active harvesting of information of the IoT device 110 (e.g., device identifier, device address, sensor readings, detector readings, or the like) by CT 120 as CT 120 moves into the vicinity of the IoT device 110.

In at least some embodiments, an IoT device 110 (or at least a portion of an IoT device 110) may be configured to remain in a sleep mode until receiving an indication of the presence of CT 120 within wireless range of the IoT device 110, at which point the IoT device 110 switches from the sleep mode to an active mode. In the sleep mode, the wireless transceiver 111 of the IoT device 110 is not active and, thus, the IoT device 110 is not operable to communicate with CT 120 using wireless transceiver 111; rather, the IoT device 110 remains in a receive-only mode for enabling the IoT device 110 to receive from CT 120 a signal adapted to cause the IoT device 110 to transition from the sleep mode to the active mode. In the active mode, the wireless transceiver 111 of the IoT device 110 is active and, thus, the IoT device 110 is operable to communicate with CT 120 using wireless transceiver 111. It will be appreciated that, although described above within the context of the IoT device 110 having operational modes associated therewith, the wireless transceiver 111 of the IoT device 110 will be understood to have corresponding operational modes associated therewith, as short-range wireless communication by the IoT device 110 with CT 120 is dependent upon the operational mode of the wireless transceiver 111. Accordingly, it also may be said that, the wireless transceiver 111 of IoT device 110 may be configured to remain in a sleep mode until receiving an indication of the presence of CT 120 within wireless range of the IoT device 110, at which point the wireless transceiver 111 of the IoT device 110 switches from the sleep mode to an active mode in which the wireless transceiver 111 of the IoT device 110 is active and, thus, IoT device 110 is operable to communicate with CT 120 using wireless transceiver 111. As discussed above, communication between the IoT device 110 and CT 120 while the IoT device 110 is in the active mode may include unidirectional communications or bidirectional communications. The signal which causes the IoT device 110 to switch from the sleep mode to the active mode also may be said to cause the IoT device 110 to wake up and, thus, also may be referred to as a wake-up signal. The wake-up signal generated and transmitted by CT 120 may be an electromagnetic signal (e.g., a radio frequency (RF) signal, an infrared signal, a visible light signal, or the like), an acoustic signal, or the like.

The wake-up signal, which is discussed in additional detail below, may be any suitable modulated waveform signal which may be transmitted by CT 120 in order to cause one or more IoT devices 110 to transition from the sleep mode to the active mode. The Ct 120 may generate the modulated waveform signal by varying one or more properties of a locally generated periodic source of the CT 120 in order to convey information to one or more IoT devices 110. In general, the modulated waveform signal may include any information which may be used by an IoT device 110 to detect the wake-up signal and switch from a sleep mode to an active mode in response to the wake-up signal. For example, the information of the modulated waveform signal may include information included in a frame of a wireless communication protocol, at least a portion of a synchronization signal of a wireless communication protocol, information included in a payload portion of a frame of a wireless communication protocol, a sequence of frames of a wireless communication protocol, or the like, many of which are discussed in additional detail below. The generation and transmission of a modulated waveform signal by the CT 120 may enable an IoT device 110 to detect, estimate, and match the modulated waveform signal such that, if a match is identified, the IoT device 110 which identified the match will transition from the sleep mode to the active mode responsive to the modulated waveform signal.

The CT 120 may be configured to generate and broadcast the wake-up signal responsive to a local determination by CT 120 to generate and broadcast the wake-up signal, under direction of a network element instructing CT 120 to generate and broadcast the wake-up signal (e.g., responsive to receipt of an instruction from IoT server 151 or any other suitable device), or the like, as well as various combinations thereof.

The CT 120 may be configured to generate the wake-up signal using information available locally at CT 120, based on information received from a network device (e.g., information indicative of a particular characteristic(s) for the wake-up signal, such as for generating a wake-up signal specific to a particular IoT device 110 or set of IoT devices 110), or the like, as well as various combinations thereof.

The CT 120 may be configured to generate and broadcast a generic wake-up signal. In general, a generic wake-up signal is intended to wake all IoT devices 110 in the short-range wireless communication coverage area of CT 120 (where it will be appreciated that, if any IoT devices 110 in the short-range wireless communication coverage area of CT 120 are using a short-range wireless communication protocol(s) different than that of CT 120, those IoT devices 110 will not wake up in response to the wake-up signal).

The CT 120 may be configured to generate and broadcast a device-specific wake-up signal. In general, a device-specific wake-up signal is intended to wake only a single IoT device 110, which is configured to recognize the device-specific wake-up signal. Here, all IoT devices 110 in the short-range wireless communication coverage area of CT 120 will receive the wake-up signal, but only the single IoT device 110 for which the wake-up signal is intended will transition from the sleep mode to the active mode responsive to the wake-up signal (the other IoT devices 110 will remain in the sleep mode). The IoT device 110 for which the device-specific wake-up signal is intended may be configured to recognize the device-specific wake-up signal using information stored on the IoT device 110 (e.g., content expected to be received in a payload of a frame or message, characteristics of a sequence of frames, or the like, as well as various combinations thereof, as discussed in additional detail below). For example, the IoT server 151, responsive to a determination that CT 120 is at a particular location at which a particular IoT device 110 was previously detected as being located, may provide device-specific information (e.g., data to be included in a payload, characteristics of a sequence of frames, or the like) to CT 120 for use by CT 120 in generating and transmitting a device-specific wake-up signal configured to wake only that particular IoT device 110 (thereby preventing other IoT devices 110 in the area from becoming active and, thus, conserving power of the other IoT devices 110 in the area). It will be appreciated that device-specific wake-up signals may be generated and transmitted by CT 120 under various other conditions and in various other ways.

The CT 120 may be configured to generate and broadcast a device-group-specific wake-up signal. In general, a device-group-specific wake-up signal is intended to wake only a group of IoT devices 110, each of which is configured to recognize the device-group-specific wake-up signal. Here, all IoT devices 110 in the short-range wireless communication coverage area of CT 120 will receive the wake-up signal, but only the IoT devices 110 in the group of IoT devices 110 for which the wake-up signal is intended will transition from the sleep mode to the active mode responsive to the wake-up signal (the other IoT devices 110 will remain in the sleep mode). The IoT devices 110 for which the device-group-specific wake-up signal is intended may be configured to recognize the device-group-specific wake-up signal using information stored on the IoT devices 110 (e.g., content expected to be received in a payload of a frame or message, characteristics of a sequence of frames, or the like, as well as various combinations thereof, as discussed in additional detail below). For example, the IoT server 151, responsive to a determination that CT 120 is at a particular location at which a particular group of IoT devices 110 was previously detected as being located, may provide device-group-specific information (e.g., data to be included in a payload, characteristics of a sequence of frames, or the like) to CT 120 for use by CT 120 in generating and transmitting a device-group-specific wake-up signal configured to wake only the IoT devices 110 in that particular group of IoT devices 110 (thereby preventing other IoT devices 110 in the area from becoming active and, thus, conserving power of the other IoT devices 110 in the area). It will be appreciated that device-group-specific wake-up signals may be generated and transmitted by CT 120 under various other conditions and in various other ways.

The use of a wake-up signal from CT 120 to control the operational state of the IoT device 110, and thus, to control communication by the IoT device 110 with CN 130, enables the IoT device 110 to be implemented as a low-power IoT device. Various embodiments of the wake-up signal generated and transmitted by CT 120, and the wake-up circuit of an IoT device 110 that is configured to detect the wake-up signal generated and transmitted by CT 120, are described in additional detail below.

As described herein, short-range wireless communications between IoT devices 110 and CT 120 may be implemented using different short-range wireless communication protocols and, thus, it will be appreciated that wake-up signals generated by CT 120 may use different short-range wireless communication protocols.

In at least some embodiments, the wake-up signal that is used to wake up a wireless transceiver 111 of an IoT device 110 is at least a portion of a synchronization signal of the short-range wireless communication protocol supported by the IoT device 110.

In at least some embodiments in which WiFi is used as the short-range wireless communication protocol, the wake-up signal may be the Short Training Sequence (STS) portion of the WiFi preamble of a WiFi frame, which has a simple periodic structure. The STS portion of the WiFi preamble is typically a repetitive sequence with 13 non-zero subcarriers equally spaced between 52 subcarriers. The cyclostationary properties of the STS portion of the WiFi preamble may enable detection of the STS portion of the WiFi preamble by implementing the wake-up circuit as a sub-sampling receiver (e.g., operating at ⅛ the rate of a typical WiFi receiver).

In at least some embodiments in which Zigbee is used as the short-range wireless communication protocol, the wake-up signal may be the preamble portion of the synchronization header (SHR) of the Zigbee frame.

In at least some embodiments in which Bluetooth is used as the short-range wireless communication protocol, the wake-up signal may be at least a portion of the access code of the Bluetooth frame or at least a portion of the header of the Bluetooth frame.

In at least some embodiments in which WiFi is used as the short-range wireless communication protocol, the wake-up signal may be both the STS and the Long Train Sequence (LTS) portions of the WiFi preamble of a WiFi frame. It is noted that, while the LTS portion of the WiFi preamble is more complex than the STS portion of the WiFi preamble, use of a combination of the STS and LTS portions of the WiFi preamble may provide higher signal-to-noise ratio (SNR), improved selectivity, and better sensitivity.

In at least some embodiments, the wake-up signal that is used to wake up a wireless transceiver 111 of an IoT device 110 is at least a portion of a payload of a frame or message of the short-range wireless communication protocol supported by the IoT device 110. For example, a frame of the short-range wireless communication protocol may be configured to include periodic signal components which may be detected by the wake-up circuit. For example, a frame of the short-range wireless communication protocol may be configured to be broadcast using a particular modulation and coding which enables detection by the wake-up circuit. The frame or message may be a WiFi frame, a Zigbee frame, a Bluetooth frame, or the like. The wake-up circuit of an IoT device 110 that is configured to detect the wake-up signal may be configured to compare payload data or characteristics of payload data received in the wake-up signal to data or data characteristics stored by the IoT device 110 for purposes of detecting the wake-up signal. The payload data may be configured to provide generic wake-up signal, a device-specific wake-up signal (e.g., where the associated IoT device 110 for which the device-specific wake-up signal is defined is configured to compare the payload data received in the device-specific wake-up signal to a set of data stored by the IoT device 110 for purposes of detecting the device-specific wake-up signal), a device-group-specific wake-up signal, or the like.

In at least some embodiments, the wake-up signal that is used to wake up a wireless transceiver 111 of an IoT device 110 is a sequence of frames configured to produce a specific "beat" signal. The characteristics of the wake-up signal may be based on one or more of the number of frames sent, the duration or length of the frames, the intervals between the frames, or the like, as well as various combinations thereof. The characteristics of the sequence of frames may enable implementation of higher-sensitivity wake-up detection circuits. The sequence of frames may be a sequence of WiFi STS preamble signals (e.g., natively as a train of WiFi frames), a sequence of Zigbee SHRs (e.g., natively as a train of Zigbee frames), or the like. The wake-up circuit of an IoT device 110 that is configured to detect the wake-up signal may be configured to compare characteristics of the sequence of frames received in the wake-up signal to characteristics stored by the IoT device 110 for purposes of detecting the wake-up signal. The sequence of frames may be configured to provide a generic wake-up signal, a device-specific wake-up signal (e.g., where the associated IoT device 110 for which the device-specific wake-up signal is defined is configured to compare characteristics of the sequence of frames received in the device-specific wake-up signal to characteristics stored by the IoT device 110 for purposes of detecting the device-specific wake-up signal), a device-group-specific wake-up signal, or the like.

In such embodiments, as indicated above, the IoT device 110, in addition to wireless transceiver 111, also includes a wake-up circuit that is configured to detect a wake-up signal from CT 120 and, responsive to detecting the wake-up signal, to cause wireless transceiver 111 to transition from the sleep mode (in which wireless transceiver 111 is not operable to communicate with CT 120 using short-range wireless communication) to the awake mode (in which wireless transceiver 111 is operable to communicate with CT 120 using short-range wireless communication). An exemplary IoT device including a wake-up circuit is depicted and described with respect to FIG. 2.

Figure 2:
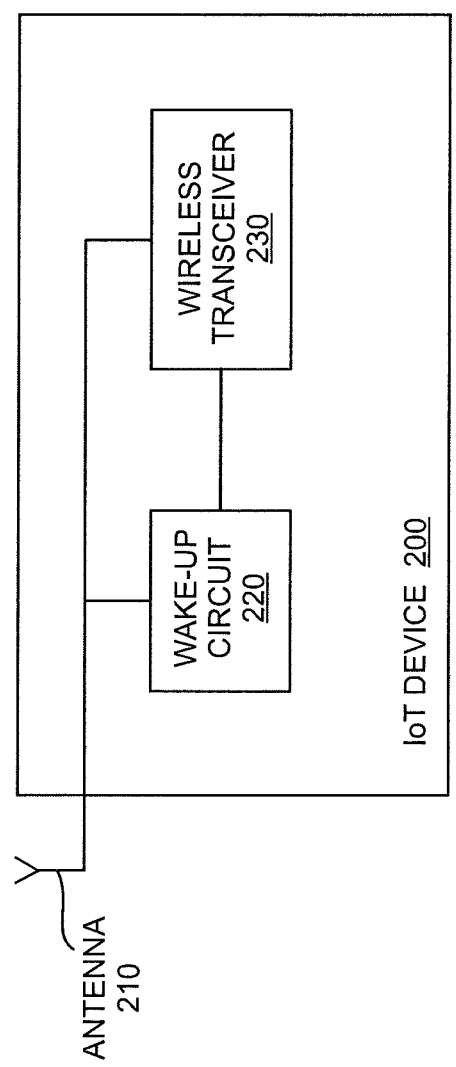
FIG. 2 depicts an exemplary IoT device including a wireless transceiver and a wake-up circuit configured to control an operational state of the wireless transceiver based on a wake-up signal.

FIG. 2 depicts an exemplary IoT device including a wireless transceiver and a wake-up circuit configured to control an operational state of the wireless transceiver based on a wake-up signal. As depicted in FIG. 2, IoT device 200 includes an antenna 210, a wake-up circuit 220 connected to the antenna 210, and a wireless transceiver 230 connected to the wake-up circuit 220 and the antenna 210. The antenna 210 is configured to receive the wake-up signal from CT 120 and provide the wake-up signal to wake-up circuit 220. The wake-up circuit 220 is configured to detect the wake-up signal and, in response to detecting the wake-up signal, to output a control signal adapted for causing the wireless transceiver 230 to transition from the sleep mode to the active mode. The wake-up circuit 200 may be configured in various ways, which may depend on one or more factors (e.g., whether the wake-up signal is generic or device-specific, the short-range wireless communication protocol being used, or the like, as well as various combinations thereof). In at least some embodiments, the wake-up circuit includes a first element (e.g., a bandpass filter and timer circuitry or the like) configured to receive the wake-up signal and to provide a filtered or selective version of the wake-up signal, a second element (e.g., an integrate-and-dump lowpass filter, an amplifier, or the like) configured to receive the filtered or selective version of the wake-up signal and to integrate at least a portion of the filtered or selective version of the wake-up signal that is below a cutoff frequency of the second element, and a detector (e.g., an energy detector, an envelope detector, or the like) configured to determine whether energy received from the second element satisfies a threshold. Various embodiments of wake-up circuit 200 are depicted and described with respect to FIGS. 3-4. The wireless transceiver 230, after transitioning to the active mode, may then communicate with CT 120 via antenna 210 using short-range wireless communications. It will be appreciated that, although primarily depicted and described with respect to embodiments in which IoT device 200 includes a single antenna 210, IoT device 210 may include multiple antennas (e.g., one antenna for reception of the wake-up signal and a separate antenna for unidirectional or bidirectional communication by IoT device 200 with CT 120 using wireless transceiver 230). It also will be appreciated that, although primarily depicted and described with respect to embodiments in which the control signal output from wake-up circuit 200 is provided directly to wireless transceiver 230, the control signal output from wake-up circuit 200 may trigger transition of wireless transceiver 230 from the sleep mode to the active mode in various other ways (e.g., wake-up circuit 200 provides a control signal to a controller which then generates an associated control signal adapted for causing the wireless transceiver 230 to transition from the sleep mode to the active mode, or the like).

Figure 3:
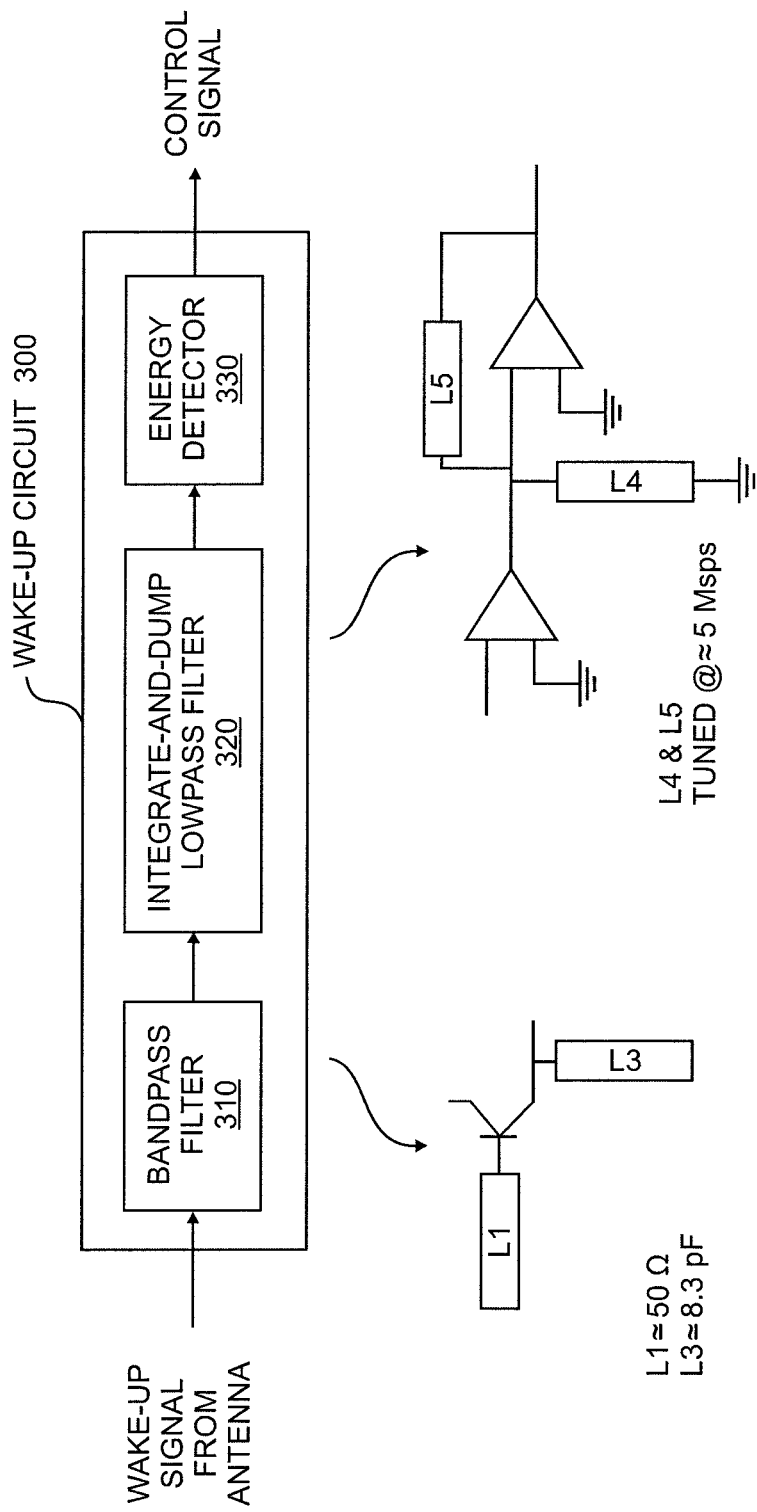
FIG. 3 depicts an exemplary wake-up circuit configured to detect a generic wake-up signal.

FIG. 3 depicts an exemplary wake-up circuit configured for use in an IoT device.

As depicted in FIG. 3, wake-up circuit 300 includes a bandpass filter 310, an integrate-and-dump lowpass filter 320, and an energy detector 330. The bandpass filter 310 is configured to receive the wake-up signal from an antenna of the IoT device (omitted for purposes of clarity). The bandpass filter 310 is a passive filter. The bandpass filter 310 produces a bandpass version of the wake-up signal. The output of the bandpass filter 310 is connected to the input of the integrate-and-dump lowpass filter 320. The integrate-and-dump lowpass filter 320 receives the bandpass version of the wake-up signal and integrates over at least a portion of the bandpass version of the wake-up signal, while dumping or filtering any portion of the bandpass version of the wake-up signal greater than a cutoff frequency, to produce an output signal. The integration function of integrate-and-dump lowpass filter 320 may be performed using an operational amplifier (op-amp) configured to operate at a fraction of the overall bandwidth of the bandpass version of the wake-up signal. The integrate-and-dump lowpass filter 320 also may be viewed as a coarse sampler. The integrate-and-dump lowpass filter 320 may be configured to operate at a relatively low sampling rate (e.g., as compared with a convention receiver that is configured for the short-range wireless communication protocol being used) and, thus, while it may be subject to aliasing responsive to full transmission using the short-range wireless communication protocol (e.g., a WiFi transmission or a Zigbee transmission), is expected to provide a detectable signal peak responsive to the wake-up signal that is broadcast based on the short-range wireless communication protocol (e.g., responsive to the STS portion of the WiFi preamble where WiFi is used, responsive to the preamble portion of the synchronization header where Zigbee is used, or the like). The output of the integrate-and-dump lowpass filter 320 is connected to the input of the energy detector 330. The energy detector 330 receives the output signal from integrate-and-dump lowpass filter 320. The energy detector 330 compares the output signal to a threshold associated with detection of the wake-up signal. The energy detector 330, based on a determination that the output signal is above the threshold associated with detection of the wake-up signal, outputs a control signal adapted for causing the wireless transceiver to transition from a sleep mode (again, in which the wireless transceiver is not operable to communicate) to an active mode (again, in which the wireless transceiver is operable to communicate). It will be appreciated that the implementation of wake-up circuit 300, or at least some components of wake-up circuit 300, may vary within and across different types of short-range wireless communication protocols which may be used for the wake-up signal (e.g., WiFi, Zigbee, Bluetooth, or the like). An exemplary implementation of bandpass filter 310 and integrate-and-dump lowpass filter 320, where the STS portion of the WiFi preamble of a WiFi frame is used as the wake-up signal, is further illustrated in FIG. 3.

As noted above, where the STS portion of the WiFi preamble of a WiFi frame is used as the wake-up signal, bandpass filter 310 and integrate-and-dump lowpass filter 320 may be implemented using specific types, numbers, arrangements, and values of components. The bandpass filter 310 may be implemented as a first-order RC bandpass filter including a resistor 311 and a capacitor 313, where the resistor 311 has a resistance of 50 ohms or approximately 50 ohms (denoted as L1=500) and the capacitor 313 has a capacitance of 8.3 pF or approximately 8.3 pF (denoted as L3=8.3 pF). The integrate-and-dump lowpass filter 320 may be implemented using a pair of operational amplifiers (op-amps) and other components arranged to provide a integration function and a lowpass filtering function at a cutoff frequency of 5 MHz or approximately 5 MHz. It will be appreciated that the implementations of bandpass filter 310 and integrate-and-dump lowpass filter 320 (e.g., types of components used, number of components used, arrangement of components, values of components, and so forth) is merely exemplary, and that various other types, numbers, arrangements, or values of components may be used to provide implementations of bandpass filter 310 or integrate-and-dump lowpass filter 320 for various types of wake-up signals (e.g., other implementations where the STS portion of the WiFi preamble of a WiFi frame is used as the wake-up signal, embodiments in which the preamble portion of the SHR of a Zigbee frame is used as the wake-up signal, or the like).

Figure 4:
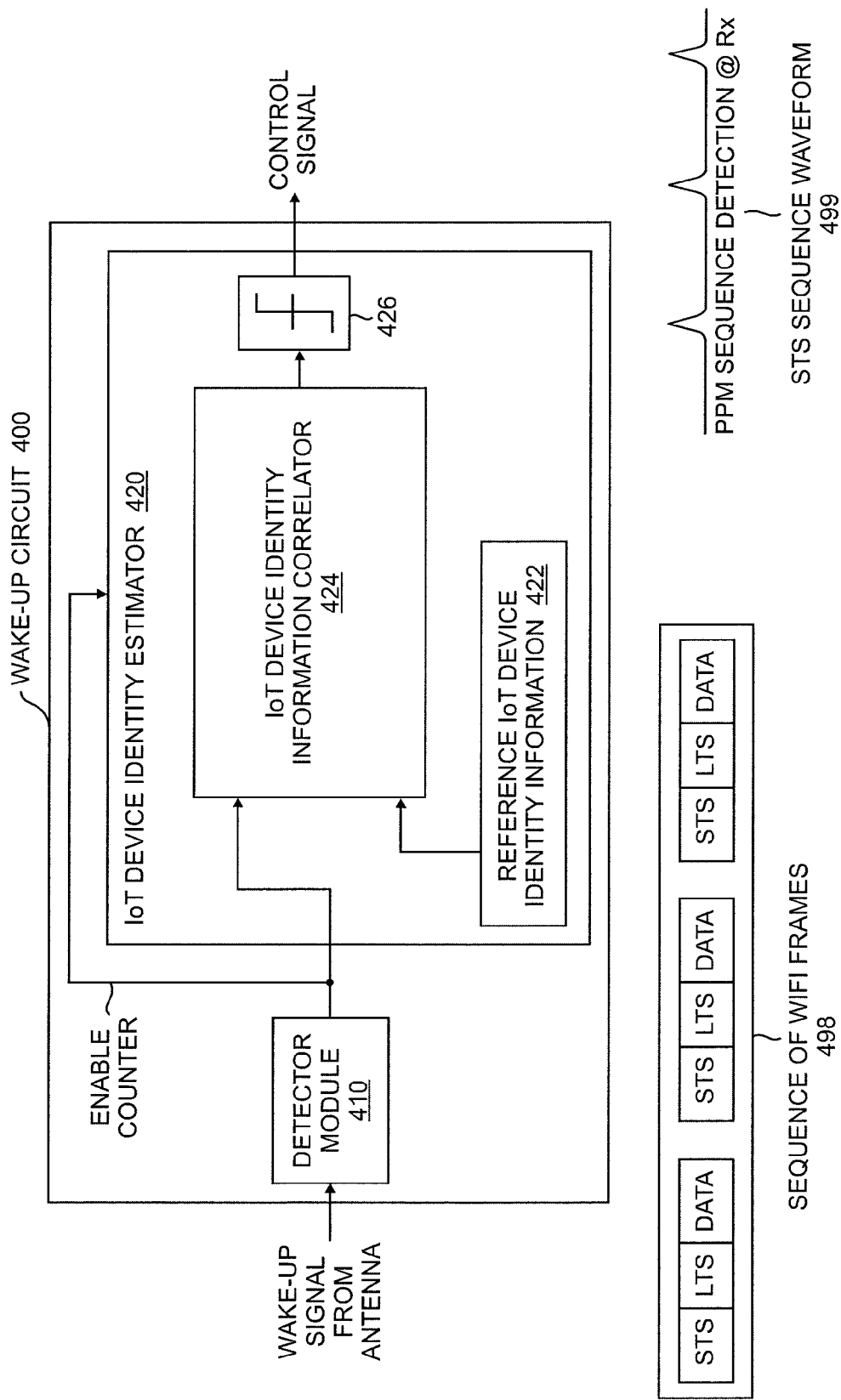
FIG. 4 depicts an exemplary wake-up circuit configured to detect a device-specific wake-up signal.

FIG. 4 depicts an exemplary wake-up circuit configured to detect a device-specific wake-up signal.

As depicted in FIG. 4, the wake-up circuit 400 includes a detector module 410 and an IoT device identity estimator 420. The detector module 410 is configured to receive the device-specific wake-up signal from an antenna of the IoT device (omitted for purposes of clarity). The detector module 410 may be implemented using wake-up circuit 300 of FIG. 3, or using any other suitable detector module. The detector module 410 outputs IoT device identity information determined from the device-specific wake-up signal. The output of detector module 410 is coupled to the input of IoT device identity estimator 420. The IoT device identity estimator 420 stores reference IoT device identity information 422 for use by IoT device identity estimator 420 in determining whether the device-specific wake-up signal is intended to wake the IoT device. The IoT device identity estimator 420 is configured to compare the IoT device identity information determined from the device-specific wake-up signal (illustratively, received from detector module 410) with the reference IoT device identity information 422 to determine whether the device-specific wake-up signal is intended to wake the IoT device. The IoT device identity estimator 420 may be configured to compare the IoT device identity information determined from the device-specific wake-up signal with the reference IoT device identity information 422, to determine whether the device-specific wake-up signal is intended to wake the IoT device, by correlating the IoT device identity information determined from the device-specific wake-up signal (e.g., in the form of a waveform) with the reference IoT device identity information 422 (e.g., also in the form of a waveform) and determining whether an associated threshold is satisfied due to correlation of the IoT device identity information determined from the device-specific wake-up signal (e.g., in the form of a waveform) with the reference IoT device identity information 422 (e.g., also in the form of a waveform). The IoT device identity estimator 420 includes an IoT device identity information correlator 424 and a threshold detector 426, where the IoT device identity information correlator 424 is configured to correlated the IoT device identity information determined from the device-specific wake-up signal with the reference IoT device identity information 422 and the threshold detector 426 is configured to determine or detect whether correlated the IoT device identity information determined from the device-specific wake-up signal with the reference IoT device identity information 422 satisfies a threshold. The correlation of the IoT device identity information determined from the device-specific wake-up signal with the reference IoT device identity information 422 may be a correlation of a waveform indicated by or determined from the IoT device identity information determined from the device-specific wake-up signal with a waveform indicated by or determined from the reference IoT device identity information 422. If the comparison or correlation of the IoT device identity information determined from the device-specific wake-up signal and the reference IoT device identity information 422 does not satisfy the threshold, either a control signal is not output from the threshold detector 426 or the control signal output from threshold detector 426 is adapted so as not to wake the IoT device (since the wake-up signal received at the wake-up circuit 400 has been determined not to be intended to wake the IoT device). If comparison or correlation of the IoT device identity information determined from the device-specific wake-up signal and the reference IoT device identity information 422 does satisfy the threshold, a control signal is output from threshold detector 426 and the control signal is adapted to wake the IoT device (since the wake-up signal received at the wake-up circuit 400 has been determined to be intended to wake the IoT device). It will be appreciated that the implementation of wake-up circuit 400, or at least some components of wake-up circuit 400 may vary within and across different types of short-range wireless communication protocols which may be used for the wake-up signal (e.g., WiFi, Zigbee, Bluetooth, or the like). An exemplary use of wake-up circuit 400, where a sequence of WiFi STSs is used as a device-specific wake-up signal, is further illustrated in FIG. 4.

As noted above, where a sequence of WiFi STSs is used as a device-specific wake-up signal, certain characteristics of the sequence of WiFi STSs (e.g., the duration or length of the STSs, the intervals between the STSs, or the like, as well as various combinations thereof) may be used as a device-specific wake-up signal. Here, where a CT intends to wake the IoT device in which wake-up circuit 400 is disposed, CT transmits a sequence of STSs (illustratively, a sequence of WiFi frames 498) having certain characteristics specific to the IoT device. The detector module 410 receives the sequence of WiFi frames 498 and produces a corresponding STS sequence waveform 499. The STS sequence waveform 499 is produced based on the sequence of WiFi frames 498 and, thus, has associated characteristics which may be used by IoT device identity estimator 420 to determine whether the wake-up signal is intended for that IoT device. The reference IoT device identity information 422 stored by IoT device identity estimator 420 includes information indicative of a reference STS sequence waveform specific to that IoT device. The IoT device identity information correlator 424 correlates the STS sequence waveform 499 determined from sequence of WiFi frames 498 with the reference STS sequence waveform specific to that IoT device. If the STS sequence waveform 499 determined from sequence of WiFi frames 498 and the reference STS sequence waveform specific to that IoT device do not match (indicative that the wake-up signal is not intended to wake the IoT device), the waveforms will not be aligned or synchronized (which also means that any peaks of the waveforms will not be aligned or synchronized) such that correlation of the waveforms will not result in any waveform peaks which exceed the threshold of the threshold detector 426 and, thus, either a control signal is not output from the threshold detector 426 or the control signal output from threshold detector 426 is adapted so as not to wake the IoT device (again, since the wake-up signal received at the wake-up circuit 400 has been determined not to be intended to wake the IoT device). If the STS sequence waveform 499 determined from sequence of WiFi frames 498 and the reference STS sequence waveform specific to that IoT device match (indicative that the wake-up signal is intended to wake the IoT device), the waveforms will be aligned, or synchronized, such that correlation of the waveforms results in one or more peaks (illustratively, three peaks in the example of FIG. 4) which exceed the threshold of the threshold detector 426 and, thus, the control signal output from threshold detector 426 is adapted to wake the IoT device (again, since the wake-up signal received at the wake-up circuit 400 has been determined to be intended to wake the IoT device).

It will be appreciated that the foregoing example represents merely one of many ways in which a device-specific wake-up signal may be processed by wake-up circuit 400 (e.g., the device-specific wake-up signal and, thus, the corresponding information produced by detector module 410, may be based on other types of WiFi information (e.g., STS+LTS, payload data, or the like), information for other short-range wireless communication protocols, or the like). Accordingly, references herein to the sequence of WiFi frames 498 and the STS sequence waveform 499 may be read more generally as references to a sequence of frames or information (which may include other frame types or information types for other wireless protocols) and a sequence waveform or waveform (which may be different when generated based on other frame types or other information types for other wireless protocols), respectively. Similarly, references herein to the reference IoT device identity information 422 and the reference STS sequence waveform may be read more generally as reference device identity information and a reference sequence waveform. Accordingly, in at least some embodiments, a device identity information correlator of an energy limited node may be configured to receive device identity information from a detector module based on processing of a wake-up signal by the detector module, compare the received device identity information and reference device identity information available to the detector module to determine whether the wake-up signal is intended for the energy limited node (e.g., which may include correlation of a waveform determined from or indicated by the received device identity information with a waveform determined from or indicated by the reference device identity information available to the detector module), and based on a determination that the received device identity information and the reference device identity information match (e.g., based on a determination that correlation of a waveform determined from or indicated by the received device identity information with a waveform determined from or indicated by the reference device identity information available to the detector module causes a threshold to be satisfied), generate or activate a control signal for triggering a communication module of the energy limited node to switch from a sleep mode in which the communication module is not operable to communicate with a wireless terminal to an active mode in which the communication module is operable to communicate with the wireless terminal.

Referring again to FIG. 1, it will be appreciated that, although primarily depicted and described with respect to embodiments in which the CT 120 is carried by a user and is the only cellular terminal operating within the vicinity of the IoT devices 110, various other scenarios, and associated embodiments, may be supported as discussed further below.

It will be appreciated that, although primarily depicted and described with respect to embodiments in which the CT 120 is carried by a user, in at least some embodiments the CT 120 (or a similar device or a device having similar capabilities) may be installed on a vehicle. The CT 120 may then operate as a gateway between IoT devices 110 and CN 130, as discussed above, as the vehicle changes location. For example, gateways similar to CT 120 may be installed on public transportation vehicles (e.g., buses, trains, or the like) for gathering smart-city data (e.g., capacity of garbage containers, parking space availability, environmental information, or the like) as the vehicles move around different portions of the city. For example, gateways similar to CT 120 may be installed on private transportation vehicles (e.g., incentivizing users to allow installation of such gateways on their vehicles). It will be appreciated that, since the IoT devices 110 are expected to use short-range wireless communications, communication between the IoT devices 110 and gateways mounted on vehicles may be performed at opportunistic times (e.g., when buses or cars stop at lights or stop signs, when buses or cars are stuck in traffic, when trains stop at train stations, or the like) during which there is sufficient time for short-range wireless communications to be used for communication with the IoT devices 110. This may enable interaction with a much larger set of IoT devices 110.

It will be appreciated that, although primarily depicted and described with respect to embodiments in which the CT 120 is carried by a user, in at least some embodiments the CT 120 (or a similar device or a device having similar capabilities) may be installed at a fixed location. In this case, the CT 120 essentially operates as a short-range-to-cellular network gateway and it is at least less likely that communication between IoT devices 110 and CN 130 opportunistic; rather, in this case, communication between IoT devices 110 and CN 130 may be more consistent and predictable.

It will be appreciated that, although primarily depicted and described with respect to embodiments in which the CT 120 is the only cellular terminal operating within the area of IoT device 110, it is expected that situations may arise in which multiple CTs 120 are operating within the area of an IoT device 110. In at least some embodiments, interaction between multiple CTs 120 and the IoT device 110 may be coordinated. The coordinated interaction between CTs 120 and the IoT device 110 may include one or more of temporal coordination, spatial coordination, or the like, as well as various combinations thereof.

In at least some embodiments, coordinated interaction between the multiple CTs 120 and the IoT device 110 may be supported by using a neighbor discovery capability to enable the multiple CTs 120 to discovery each other and to establish communications so that the multiple CTs 120 may exchange messages in order to synchronize and sequence their actions related to interaction with the IoT device 110.

In at least some embodiments, coordinated interaction between the multiple CTs 120 and the IoT device 110 may be supported using spatial coordination. The spatial coordination may be based on estimated location information (e.g., based on GPS, triangulation, or the like, as well as various combinations thereof) indicative of estimated relative spatial locations of the CTs 120. The spatial coordination may be based on channel pathloss estimates which may be used to estimate relative spatial locations of the CTs 120. The channel pathloss estimates may be determined during neighbor discovery or in any other suitable manner. The channel pathloss estimates may be maintained in a set of pathloss table generated and maintained on the CTs 120 (which also may be considered to be a single, distributed pathloss table), which may be constructed by (1) having each CT 120 transmit a probe signal (e.g., WiFi frame or the like) including its identifier and its transmit power and (2) having each CT 120 which receives a probe signal update its one-hop neighbor table and broadcast the received probe signal. This iterative process results in generation of the pathloss tables of the CTs 120. The pathloss tables of the CTs 120 may be exchanged and merged to form a local terminal map for the CTs 120, where the local terminal map for the CTs 120 may include information indicative of estimated relative spatial locations of the CTs 120. It will be appreciated that such estimated location information for the CTs 120 may be determined in a distributed or centralized manner.

In at least some embodiments, the coordinated interaction between CTs 120 may include determining an ordered sequence of the CTs 120 which represents the order in which the CTs 120 will attempt to interact with (e.g., wake-up) the IoT device 110 (e.g., the first CT 120 in the ordered sequence of the CTs 120 attempts to wake the IoT device 110, if the first CT 120 in the ordered sequence of the CTs 120 fails to wake the IoT device 110 then the second 120 in the ordered sequence of the CTs 120 attempts to wake the IoT device 110, and so forth). As discussed further below, the ordering of the ordered sequence of CTs 120 may be based on the likelihood that the CTs 120 will successfully wake the IoT device 110 (e.g., based on spatial locations of the CTs 120 relative to the IoT device), based on available battery power of the CTs 120, or the like, as well as various combinations thereof. The potential basis for the ordering of the ordered sequence of CTs 120 is discussed further below in conjunction with a description of various benefits of using coordination between the CTs 120 for waking and communicating with the IoT device 110.

In at least some embodiments, the coordinated interaction between CTs 120 may reduce interference and collisions. It may be beneficial to avoid the case where multiple CTs 120 attempt to wake up one or more IoT devices 110 simultaneously, because, if this occurs, there is a high probability of interference and collisions. For example, if IoT devices 110 and CTs 120 use WiFi technology to communicate, it is likely that the hidden terminal problem will occur. A conventional way of mitigating this problem is via control message exchanges (e.g., Request to Send (RTS)/Clear to Send (CTS)), however, use of such control messages causes a high overhead which is particularly problematic for the energy-limited IoT devices 110. Accordingly, in at least some embodiments, cooperative communication among CTs 120 (e.g., using temporal coordination, spatial coordination, or the like) may be employed in order to avoid this problem. The pairing between CT 120 and an IoT device 110 using cooperative communication among CTs 120 mitigates co-channel interference while minimizing device energy consumption.

In at least some embodiments, the coordinated interaction between CTs 120 may reduce the number of transmissions. In at least some cases, given a choice of CTs 120 which may transmit the wake-up signal, it may be better to sequence the wake-up attempts by the CTs 120 starting from a CT 120 having a highest chance of success down to a CT 120 having a lowest chance of success. For example, the ordering of the wake-up attempts by the CTs 120 may be based on terminal location information (e.g., absolute locations (e.g., based on GPS coordinates) or relative locations (e.g., based on pathloss estimates)). It is noted that, while the overlapping coverage area between transmissions by CTs 120 may not be known, the relative positions of the CTs 120 may be determined and may be used ordering of the wake-up attempts by the CTs 120. The ordering of the wake-up attempts by the CTs 120 is this manner is expected to reduce the number of wake-up signal transmissions performed in order to wake IoT devices 110.

In at least some embodiments, the coordinated interaction between CTs 120 may be improved or optimized based on spatial coordination. For example, the ordering of the wake-up attempts by the CTs 120 may be based on spatial locations of the CTs 120. For convenience, consider a set of CTs 120 arranged in a line. In one embodiment, an edge CT 120 may transmit a wake-up signal first. If no IoT device 110 responds to the wake-up signal, another edge CT 120 may transmit a wake-up signal. If no IoT device 110 responds to the wake-up signal, a central CT 120 may attempt to wake any IoT device 110 within its wireless coverage range. If no IoT device 110 responds to the wake-up signal, then any CTs 120 that are midway between the central CT 120 and the edge CTs 120 may transmit wake-up signals. The attempts may proceed in this manner until the IoT device 110 is finally awakened. It will be appreciated that, while it may be unlikely that the CTs 120 will be arranged along a line, the technique may be applied to any spatial arrangement of CTs 120.

It will be appreciated that, although primarily depicted and described with respect to embodiments in which the wireless terminal that is configured to operate as a gateway for communications of an IoT device 110 is a cellular terminal that is configured to communicate with a cellular network (namely, CT 120 that is configured to communicate with CN 130), in at least some embodiments the wireless terminal that is configured to operate as a gateway for communications of an IoT device 110 may be a wireless terminal using a wireless communication capability other than cellular communications. An exemplary embodiment of a more general wireless terminal that is configured to operate as a gateway for communications of an IoT device 110 is depicted and described with respect to FIG. 5.

Figure 5:
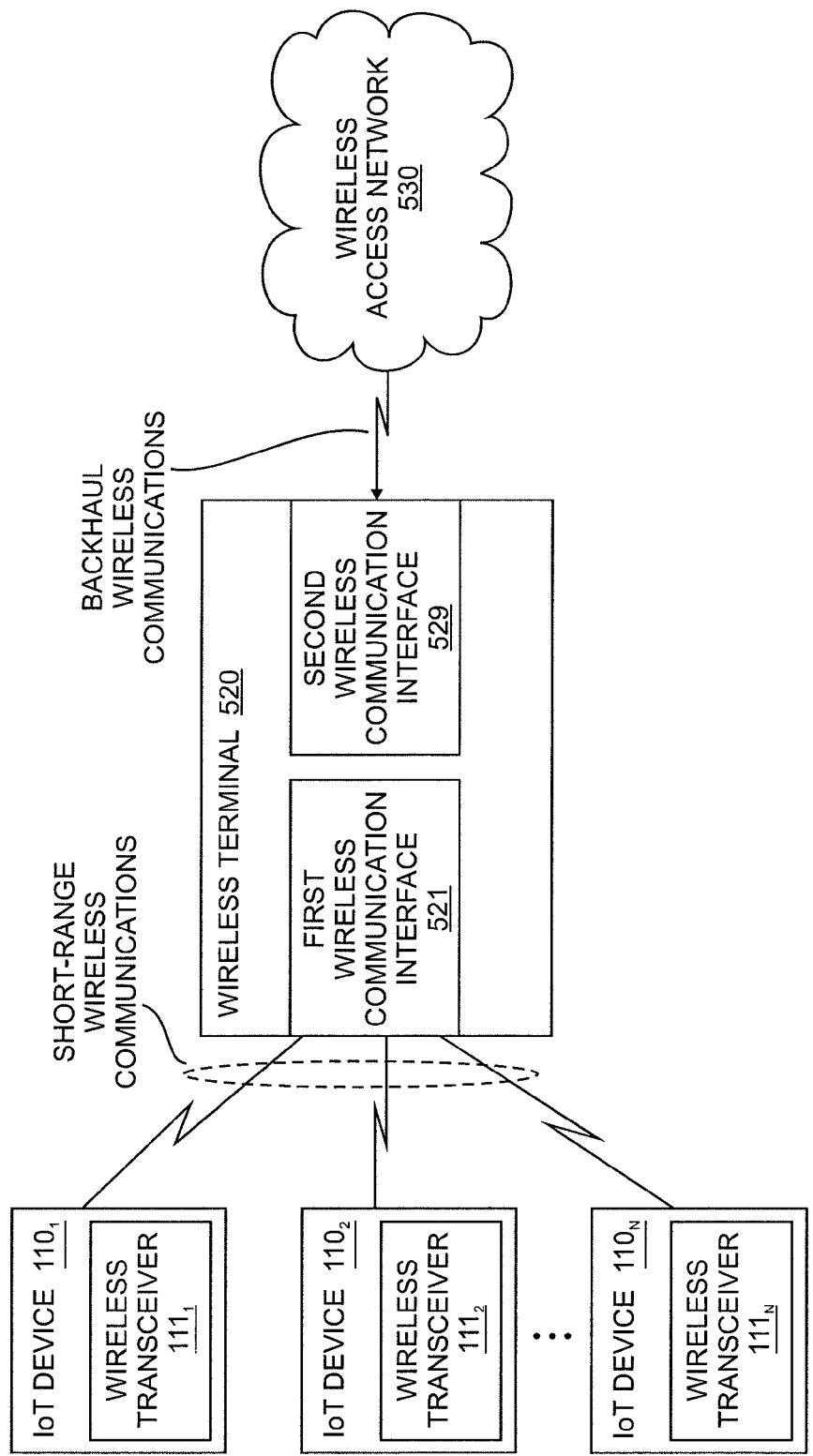
FIG. 5 depicts an exemplary wireless terminal configured to operate as a gateway between an IoT device and a wireless access network.

FIG. 5 depicts an exemplary wireless terminal configured to operate as a gateway between an IoT device and a wireless access network. As depicted in FIG. 5, a wireless terminal (WT) 520 is configured to operate as a gateway between IoT devices 110 and a wireless access network (WAN) 530. The IoT devices 110 are depicted and described in detail with respect to FIG. 1. The WT 520 represents a more generic version of CT 120 of FIG. 1 and, therefore, may perform various functions depicted and described as being supported by CT 120 of FIG. 1. Similarly, the WAN 530 represents a more generic version of CN 130 of FIG. 1 and, therefore, may perform various functions depicted and described as being supported by CN 130 of FIG. 1. The implementation of WAN 520 may depend on the type of wireless communication technology used (e.g., a cellular network such as CN 130 depicted and described with respect to FIG. 1 where WAN 530 is a cellular network, a Wireless Local Area Network (WLAN) where WAN 530 is based on WiFi, satellite communication infrastructure where WAN 530 is a satellite backhaul communication network, or the like). Additionally, although omitted for purposes of clarity, WAN 130 also may support communications with various other communication networks and elements (e.g., other access communication networks, core communication networks, the Internet, IoT center 150, endpoints 160, or the like, as well as various combinations thereof). The WT 520 includes a first wireless communication interface 521 configured to support wireless communications with IoT devices 110 and a second wireless communication interface 529 configured to support wireless communications with WAN 530. The first wireless communication interface 521 may be configured to support any suitable short-range wireless communication capabilities (e.g., WiFi, Zigbee, Bluetooth, or the like). The second wireless communication interface 529 may be configured to support any suitable backhaul wireless communication capabilities via which WT 520 obtain network access (e.g., cellular, WiFi, satellite, or the like). It will be appreciated that, although primarily depicted and described with respect to embodiments in which WN 520 includes two wireless communication interfaces, WN 520 may include fewer or more wireless communication interfaces (e.g., a single WiFi communication interface which may be utilized for communications with IoT devices 110 and WAN 530, two WiFi communication interfaces and a cellular communication interface, or the like). In view of FIG. 5, it will be appreciated that various references herein to "cellular terminal" and "cellular network" may be read more generally as "wireless terminal" and "wireless access network", respectively. It will be appreciated that various functions depicted and described herein within the context of FIG. 1 also may be performed within the context of FIG. 5 using other types of wireless communication capabilities.

Figure 6:
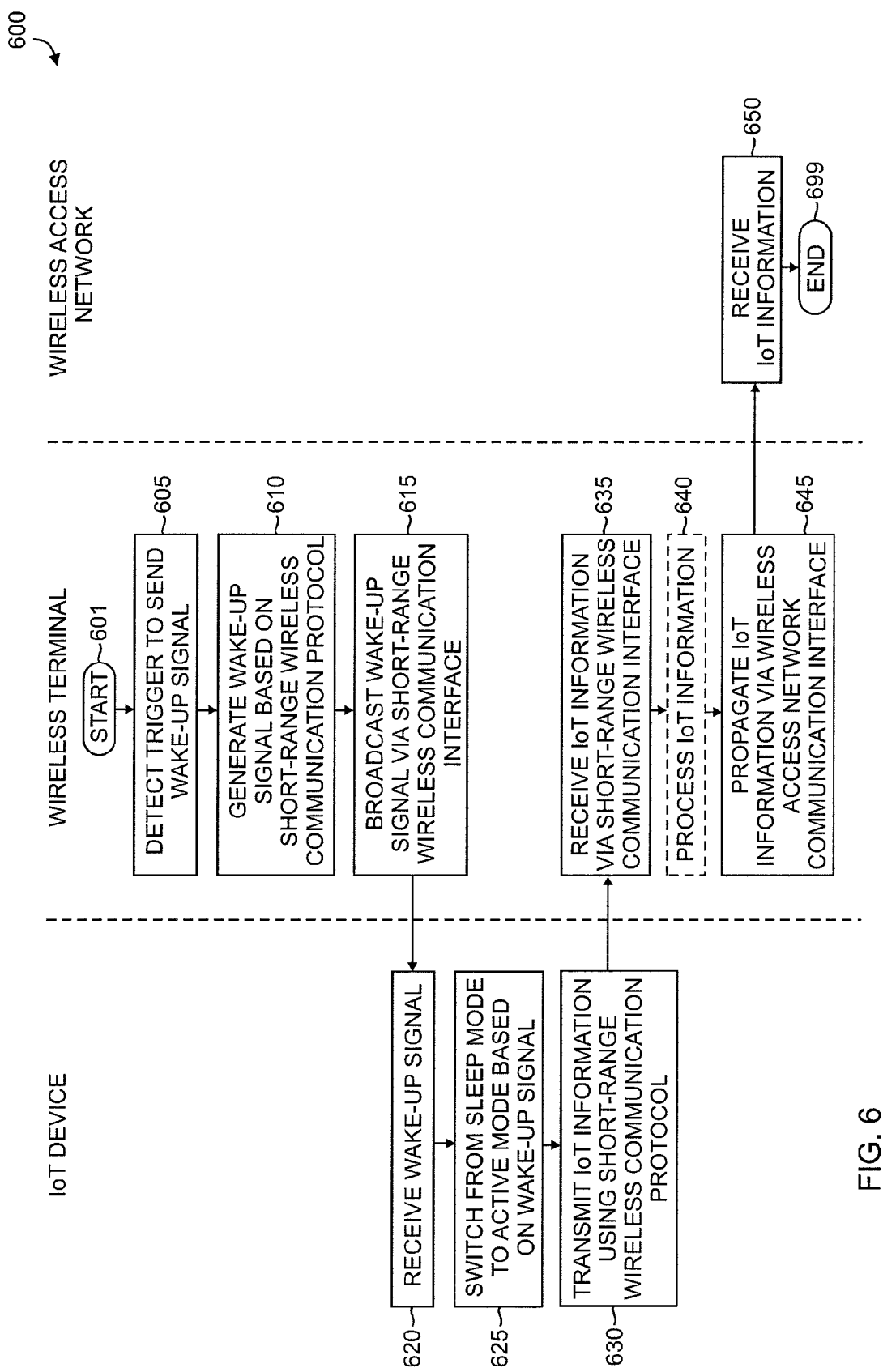
FIG. 6 depicts an exemplary embodiment of a method for supporting use of a cellular terminal as a gateway between an IoT device and a wide-area network.

FIG. 6 depicts an exemplary embodiment of a method for supporting use of a wireless terminal as a gateway between an IoT device and a wireless access network. As depicted in FIG. 6, various portions of method 600 are performed on different elements (illustratively, a wireless terminal, an IoT device, and a wireless access network) and, thus, it will be appreciated that method 600 may be implemented as separate methods executing on these elements. It will be appreciated that, although primarily depicted and described as being performed serial, at least a portion of the steps of method 600 may be performed contemporaneously or in a different order than as presented in FIG. 6. At step 601, method 600 begins. At step 605 the wireless terminal detects a trigger to send a wake-up signal (e.g., detects that it is at a location, receives an instruction from an IoT server, or the like). At step 610, the wireless terminal generates a wake-up signal based on a short-range wireless communication protocol (e.g., WiFi, Zigbee, Bluetooth, or the like). At step 615, the wireless terminal broadcasts the wake-up signal via a short-range wireless communication interface. At step 620, the IoT device receives the wake-up signal from the wireless terminal. At step 625, the IoT device switches from a sleep mode to an active mode based on the wake-up signal. At step 630, the IoT device transmits IoT information using a short-range wireless communication protocol. At step 635, the wireless terminal receives the IoT information from the IoT device via the short-range wireless communication interface. At step 640 (an optional step), the wireless terminal processes the IoT information (e.g., modifying the IoT information, supplementing the IoT information with additional information, or the like). At step 645, the wireless terminal propagates the IoT information toward the wireless access network via a wireless access network communication interface. At step 650, the wireless access network receives the IoT information from the wireless terminal. At step 699, method 600 ends. It will be appreciated that method 600 of FIG. 6 may be modified in accordance with various other embodiments depicted and described herein. For example, where the IoT device is active and does not require a wake-up signal in order to wake-up and transmit information, steps 605-625 may be omitted. For example, although omitted for purposes of clarity, the wireless terminal may support store and forward functions for communications of the IoT device (such that there may be delays between at least some of the steps of method 600 until specific triggers for forwarding of the IoT information are detected). For example, although omitted for purposes of clarity, the wireless terminal may facilitate additional communication between the IoT device and the wide-area network (e.g., supporting bidirectional communication between the IoT device and the wide-area network).

It will be appreciated that, although primarily depicted and described with respect to embodiments in which communication between IoT devices and wireless terminals is performed (or useful for) reducing the amount of energy consumed by the IoT devices, communication between IoT devices and wireless terminals also may be performed (or useful) under various other conditions (e.g., where communication between an IoT device and a wireless terminal is known or expected to cost less than communication between the IoT device and the network infrastructure where an IoT device does not have permission (e.g., authentication credentials) to use the network infrastructure supporting communications with an IoT center or endpoints, where an IoT device is unable to establish a connection to the network infrastructure (e.g., where signal attenuation is greater than a threshold), or the like, as well as various combinations thereof).

It will be appreciated that, although primarily depicted and described within the context of embodiments in which the IoT device, or energy limited node, includes a transceiver configured for both wireless transmission and wireless reception, in at least some embodiments the IoT device, or energy limited node, may include only a wireless transmitter (e.g., transmitting information in response to detection of a wake-up signal) or only a wireless receiver (e.g., waking up responsive to a wake-up signal such that information may be received). Accordingly, in at least some embodiments, references herein to the transceiver of an IoT device, or energy limited node, may be read more generally as being a communication module (e.g., a wireless transceiver, a wireless transmitter, a wireless receiver, or the like).

It will be appreciated that, although primarily depicted and described within the context of an IoT environment (e.g., where the energy limited node is considered to be an IoT device, where information that is communicated to and from the energy limited node is considered to be IoT information, and so forth), various embodiments depicted and described herein may be used within various other environments and contexts which may not be considered to be IoT environments or contexts (e.g., for energy limited nodes that are not operating as or not considered to be IoT devices, where information that is communicated to and from the energy limited node is not or is not considered to be IoT information, and so forth).

Figure 7:
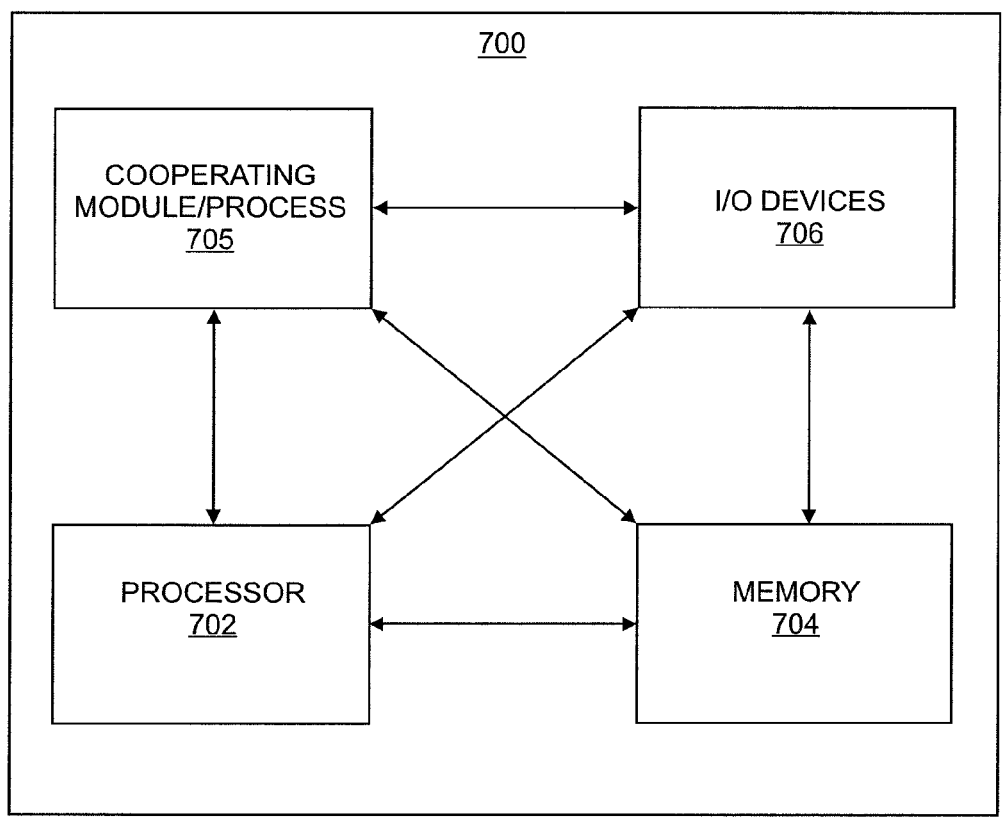
FIG. 7 depicts a high-level block diagram of a computer suitable for use in performing functions described herein.

FIG. 7 depicts a high-level block diagram of a computer suitable for use in performing functions described herein.

The computer 700 includes a processor 702 (e.g., a central processing unit (CPU) and/or other suitable processor(s)) and a memory 704 (e.g., random access memory (RAM), read only memory (ROM), and the like).

The computer 700 also may include a cooperating module/process 705. The cooperating process 705 can be loaded into memory 704 and executed by the processor 702 to implement functions as discussed herein and, thus, cooperating process 705 (including associated data structures) can be stored on a computer readable storage medium, e.g., RAM memory, magnetic or optical drive or diskette, and the like.

The computer 700 also may include one or more input/output devices 706 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 700 depicted in FIG. 7 provides a general architecture and functionality suitable for implementing functional elements described herein and/or portions of functional elements described herein. For example, the computer 700 provides a general architecture and functionality suitable for implementing an IoT device 110, a portion of an IoT device 110, CT 120, a portion of CT 120, CBS 131, a portion of CBS 131, one or more elements of CCN 132, IoT server 151, a portion of IoT server 151, IoT database 152, a portion of IoT database 152, an endpoint 160, a portion of an endpoint 160, a WT 520, an element of WAN 530, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

Aspects of various embodiments are specified in the claims. Those and other aspects of various embodiments are specified in the following numbered clauses: Clause 1. A wireless terminal, comprising:

a first wireless communication interface configured for communication with a device using a wireless communication protocol;

a second wireless communication interface configured for wireless communication with a wireless access node of a wireless network; and a processor configured to support opportunistic forwarding of information between the device and the wireless access node of the wireless network. Clause 2. The wireless terminal of clause 1, wherein the processor is configured to:

receive information received from the device via the first wireless communication interface; and propagate the information toward the wireless access node of the wireless network via the second wireless communication interface. Clause 3. The wireless terminal of clause 2, wherein the information comprises at least one of information for association of the device with the wireless network, information for authentication of the device to the wireless network, or information stored on or determined by the device. Clause 4. The wireless terminal of clause 2, wherein the processor is configured to:

prior to propagating the information toward the wireless access node of the wireless network via the second wireless communication interface, modify the received information to include additional information. Clause 5. The wireless terminal of clause 4, wherein the additional information comprises at least one of time information or location information. Clause 6. The wireless terminal of clause 5, wherein the time information comprises at least one of a time at which the device sent the information or a time at which the wireless terminal received the information. Clause 7. The wireless terminal of clause 5, wherein the location information comprises at least one of a location of the device or a location of the wireless terminal. Clause 8. The wireless terminal of clause 5, wherein the processor is configured to determine the additional information based on at least one of a global positioning system (GPS) capability of the wireless terminal, an assisted-GPS capability of the wireless terminal, an indoor location determination capability, or information from the device. Clause 9. The wireless terminal of clause 2, wherein the processor is configured to:

store the information prior to propagating the information toward the wireless access node of the wireless network via the second wireless communication interface; and propagate the information toward the wireless access node of the wireless network via the second wireless communication interface based on detection of a condition. Clause 10. The wireless terminal of clause 1, wherein the processor is configured to:

receive information received from the wireless access node of the wireless network via the second wireless communication interface; and propagate the received information toward the device via the first wireless communication interface. Clause 11. The wireless terminal of clause 10, wherein the information comprises at least one of information for association of the device with the wireless network, information for authentication of the device to the wireless network, a request message requesting information from the device, a command for triggering the device to initiate one or more actions, a software update for the device, or system management information. Clause 12. The wireless terminal of clause 10, wherein the processor is configured to:

store the information prior to propagating the information toward the device via the first wireless communication interface; and propagate the information toward the device via the first wireless communication interface based on detection of a condition. Clause 13. The wireless terminal of clause 1, wherein the processor is configured to:

temporarily suspend information forwarding for the device based on information inferred by the wireless terminal or an instruction received via the wireless network. Clause 14. The wireless terminal of clause 1, wherein the processor is configured to support opportunistic forwarding of information between the device and the wireless access node of the wireless network by controlling an operational mode of the device. Clause 15. The wireless terminal of clause 14, wherein the processor configured to control the operational mode of the device based on a wake-up signal generated by the processor for the device. Clause 16. The wireless terminal of clause 15, wherein the wake-up signal is configured to cause a communication module of the device to switch from a sleep mode in which the communication module is not operable to communicate with the wireless terminal to an active mode in which the communication module is operable to communicate with the wireless terminal. Clause 17. The wireless terminal of clause 15, wherein the processor is configured to generate the wake-up signal for the device based on at least one of information determined locally at the wireless terminal or information received from a server via the wireless network. Clause 18The wireless terminal of clause 15, wherein the wake-up signal comprises a modulated waveform signal. Clause 19. The wireless terminal of clause 18, wherein the modulated waveform signal comprises at least one of:

information included in a frame of the wireless communication protocol;

at least a portion of a synchronization signal of the wireless communication protocol;

information included in a payload portion of a frame of the wireless communication protocol; or a sequence of frames of the wireless communication protocol. Clause 20. The wireless terminal of clause 1, wherein the wireless communication protocol comprises WiFi, Zigbee, or Bluetooth. Clause 21. The wireless terminal of clause 1, wherein the second wireless communication interface is configured to support at least one of WiFi communications or cellular communications. Clause 22. The wireless terminal of clause 1, wherein the processor is configured to:

coordinate with at least one other wireless terminal for supporting opportunistic forwarding of information between the device and the wireless network. Clause 23. The wireless terminal of clause 22, wherein the processor is configured to coordinate with at least one other wireless terminal for supporting opportunistic forwarding of information between the device and the wireless network based on at least one of temporal coordination or spatial coordination. Clause 24. The wireless terminal of clause 1, wherein the processor is configured to:

discover at least one other wireless terminal within a vicinity of the device; and establish communication with each of the at least one other wireless terminal within the vicinity of the device; and exchange messages with the at least one other wireless terminal within the vicinity of the device for synchronizing and sequencing actions performed by the wireless terminal and the at least one other wireless terminal for supporting opportunistic forwarding of information between the device and the wireless network. Clause 25. A method for use by a wireless terminal, comprising:

broadcasting a wake-up signal via a first wireless communication interface configured for communication using a wireless communication protocol;

receiving information from a device via the first wireless communication interface configured for communication using the wireless communication protocol; and propagating the information via a second wireless communication interface configured for wireless communication with a wireless access node of a wireless network.

It will be appreciated that, although various embodiments which incorporate the teachings presented herein have been shown and described in detail herein, those skilled in the art can readily devise many other varied embodiments that still incorporate these teachings.

What is claimed is:

1. A method for use by an energy limited node, comprising:

detecting, at a wake-up circuit of the energy limited node, a wake-up signal from a wireless terminal, the wake-up signal comprising a modulated waveform signal, the wake-up signal comprising a sequence of frames of a short-range wireless communication protocol, wherein the frames include respective preambles to provide thereby a sequence of preambles;

producing, by the wake-up circuit of the energy limited node based on the sequence of preambles, a preamble sequence waveform; and generating, by the wake-up circuit of the energy limited node based on detection of the wake-up signal based on the preamble sequence waveform, a control signal configured to cause a communication module of the energy limited node to switch from a sleep mode in which the communication module is not operable to communicate with the wireless terminal to an active mode in which the communication module is operable to communicate with the wireless terminal.

2. An energy limited node, comprising:

a wake-up circuit configured to detect a wake-up signal from a wireless terminal, the wake-up signal comprising a modulated waveform signal, the wake-up signal comprising a sequence of frames of a short-range wireless communication protocol, wherein the frames include respective preambles to provide thereby a sequence of preambles, wherein the wake-up circuit is configured to produce a preamble sequence waveform based on the sequence of preambles; and a communication module configured to switch, based on a control signal generated by the wake-up circuit based on detection of the wake-up signal, from a sleep mode in which the communication module is not operable to communicate with the wireless terminal to an active mode in which the communication module is operable to communicate with the wireless terminal.

3. The energy limited node of claim 2, wherein the sequence of frames of the short-range wireless communication protocol comprises a sequence of WiFi frames, a sequence of Bluetooth frames, or a sequence of Zigbee frames.

4. The energy limited node of claim 2, wherein the short-range wireless communication protocol comprises WiFi, Bluetooth, or Zigbee.

5. The energy limited node of claim 2, wherein the sequence of frames is configured to have a duration during which the sequence of frames is transmitted, a number of frames transmitted in the sequence of frames, and a period between the frames transmitted in the sequence of frames.

6. The energy limited node of claim 2, wherein the wake-up circuit is configured to:
receive the wake-up signal and provide a filtered or selective version of the wake-up signal;
integrate at least a portion of the filtered or selective version of the wake-up signal that is below a cutoff frequency to provide thereby energy associated with the wake-up signal; and
determine whether the energy associated with the wake-up signal satisfies a threshold.

7. The energy limited node of claim 6, wherein the wake-up circuit comprises a bandpass filter and timer circuitry configured to receive the wake-up signal and provide the filtered or selective version of the wake-up signal.

8. The energy limited node of claim 6, wherein the wake-up circuit comprises an integrate-and-dump lowpass filter configured to integrate at least a portion of the filtered or selective version of the wake-up signal that is below the cutoff frequency to provide thereby energy associated with the wake-up signal.

9. The energy limited node of claim 6, wherein the wake-up circuit comprises a detector configured to determine whether the energy associated with the wake-up signal satisfies a threshold.

10. The energy limited node of claim 9, wherein the detector is configured to:
based on detection that the energy received from the associated with the wake-up signal satisfies the threshold, generate the control signal for triggering the communication module to switch from the sleep mode in which the communication module is not operable to communicate with the wireless terminal to the active mode in which the communication module is operable to communicate with the wireless terminal.

11. The energy limited node of claim 2, wherein the wake-up circuit comprises:
a bandpass filter configured to receive the wake-up signal and to produce a bandpass signal;
an integrate-and-dump lowpass filter configured to receive the bandpass filter and integrate at least a portion of the bandpass signal that is below a cutoff frequency of the integrate-and-dump lowpass filter; and
an energy detector configured to determine whether energy received from the integrate-and-dump lowpass filter satisfies a threshold.

12. The energy limited node of claim 2, wherein the wake-up circuit comprises:
a detector configured to receive the wake-up signal and determine device identity information from the wake-up signal; and
a device identity estimator configured to determine, based on a comparison of the device identity information with reference device identity information specific to the energy limited node, whether the wake-up signal is intended for the energy limited node.

13. The energy limited node of claim 12, wherein the device identity estimator is configured to:
based on a determination that the received device identity information and the reference device identity information match, generate the control signal for triggering the communication module to switch from the sleep mode in which the communication module is not operable to communicate with the wireless terminal to the active mode in which the communication module is operable to communicate with the wireless terminal.

14. The energy limited node of claim 12, wherein the device identity estimator comprises:

a device identity information correlator configured to:
receive the device identity information from the detector; and
compare the received device identity information and the reference device identity information to determine whether the wake-up signal is intended for the energy limited node.

15. The energy limited node of claim 12, wherein the device identity estimator comprises:
a device identity information correlator configured to correlate a waveform associated with the device identity information and a waveform associated with the reference device identity information specific to the energy limited node; and
a threshold detector configured to determine whether correlation of the waveform associated with the device identity information and the waveform associated with the reference device identity information specific to the energy limited node causes a threshold to be satisfied.

16. The energy limited node of claim 12, wherein the reference device identity information comprises information indicative of one or more characteristics of a reference sequence of frames of the short-range wireless communication protocol that is specific to the energy limited node.

17. The energy limited node of claim 2, wherein the communication module is configured to transmit information toward the wireless terminal while in the active mode.

18. The energy limited node of claim 2, wherein the communication module is configured to receive information from the wireless terminal while in the active mode.

19. The energy limited node of claim 2, wherein the modulated waveform signal is received from the wireless terminal based on control by the wireless terminal of opportunistic forwarding of information between the energy limited node and a wireless network.

20. The energy limited node of claim 2, wherein the frames are WiFi frames, wherein the preambles of the respective WiFi frames include respective Short Training Sequences (STSs) to provide thereby a sequence of STSs, wherein the preamble sequence waveform comprises an STS sequence waveform produced based on the sequence of STSs.

21. The energy limited node of claim 2, wherein the frames are WiFi frames, wherein the preambles of the respective WiFi frames include respective Long Training Sequences (LTSs) to provide thereby a sequence of LTSs, wherein the preamble sequence waveform comprises an LTS sequence waveform produced based on the sequence of LTSs.

22. The energy limited node of claim 2, wherein the frames are Zigbee frames, wherein the preambles of the respective Zigbee frames include respective Zigbeee preambles to provide thereby a sequence of Zigbee preambles, wherein the preamble sequence waveform comprises a Zigbee preamble sequence waveform produced based on the sequence of Zigbee preambles.

23. The energy limited node of claim 2, wherein the wake-up circuit is configured to detect the wake-up signal based on a determination that the preamble sequence waveform matches a reference preamble sequence waveform associated with the energy limited node.

24. The energy limited node of claim 2, wherein the wake-up circuit is configured to:
determine a correlation of the preamble sequence waveform and a reference preamble sequence waveform associated with the energy limited node;

determine whether the correlation of the preamble sequence waveform and the reference preamble sequence waveform associated with the energy limited node causes a threshold to be satisfied; and generate the control signal based on a determination that the correlation of the preamble sequence waveform and the reference preamble sequence waveform associated with the energy limited node causes the threshold to be satisfied.

* * * * *